United States Patent
Ji et al.

(10) Patent No.: US 8,295,225 B2
(45) Date of Patent: Oct. 23, 2012

(54) REVERSE LINK FEEDBACK FOR INTERFERENCE CONTROL IN A WIRELESS COMMUNICATION SYSTEM

(75) Inventors: Tingfang Ji, San Diego, CA (US); Rajat Prakash, San Diego, CA (US); Mohammad J. Borran, San Diego, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 775 days.

(21) Appl. No.: 11/848,755

(22) Filed: Aug. 31, 2007

(65) Prior Publication Data

US 2008/0175185 A1     Jul. 24, 2008

Related U.S. Application Data

(60) Provisional application No. 60/843,034, filed on Sep. 8, 2006.

(51) Int. Cl.
*H04B 7/185* (2006.01)
*H04B 17/02* (2006.01)

(52) U.S. Cl. ........................ 370/318; 455/135

(58) Field of Classification Search ............. 370/395.21, 370/329, 330, 431, 318, 320, 331, 332, 333; 455/452.2, 134, 135, 226.2, 69, 115.3, 13.4, 455/24, 133, 436–455, 63.1, 63.2
See application file for complete search history.

(56) References Cited

U.S. PATENT DOCUMENTS

| | | | |
|---|---|---|---|
| 6,553,010 B1 | 4/2003 | Jober | |
| 6,600,903 B1 * | 7/2003 | Lilja et al. | 455/67.11 |
| 7,602,722 B2 * | 10/2009 | Chheda | 370/236 |
| 7,668,561 B2 * | 2/2010 | Au et al. | 455/522 |
| 7,742,444 B2 * | 6/2010 | Mese et al. | 370/318 |
| 7,751,367 B2 * | 7/2010 | Gaal et al. | 370/332 |
| 2004/0109424 A1 | 6/2004 | Chheda | |
| 2005/0192042 A1 | 9/2005 | Au et al. | |
| 2006/0262754 A1 * | 11/2006 | Andersson et al. | 370/332 |

FOREIGN PATENT DOCUMENTS

CN        1377562 A        10/2002
(Continued)

OTHER PUBLICATIONS

International search Report, PCT/US07/077628, International Search Authority, European Patent Office, Mar. 4, 2008.

(Continued)

*Primary Examiner* — Hanh Nguyen
(74) *Attorney, Agent, or Firm* — Donald C. Kordich

(57) ABSTRACT

Systems and methodologies are described that provide techniques for generating and utilizing reverse link feedback for interference management in a wireless communication system. Channel quality and/or interference data can be obtained by a terminal from a serving sector and one or more neighboring sectors, from which an interference-based headroom value can be computed that contains interference caused by the terminal to an allowable range. The interference-based headroom value can then be provided with power amplifier (PA) headroom feedback to the serving sector. Based on the provided feedback from the terminal, the serving sector can assign resources for use by the terminal in communication with the serving sector. Further, the serving sector may choose to honor or disregard a received interference-based power value based on quality of service and/or other system parameters.

35 Claims, 16 Drawing Sheets

FOREIGN PATENT DOCUMENTS

| | | |
|---|---|---|
| CN | 1812282 A | 8/2006 |
| EP | 0847146 | 6/1998 |
| EP | 1460789 | 9/2004 |
| WO | 2005036909 | 4/2005 |
| WO | 2006007318 | 1/2006 |
| WO | WO2006049460 A1 | 5/2006 |
| WO | WO2006049669 | 5/2006 |

OTHER PUBLICATIONS

Written Opinion, PCT/US07/077628, International Search Authority, European Patent Office, Mar. 4, 2008.
Taiwan Search Report—TW096133601—TIPO—Apr. 13, 2011.

\* cited by examiner

REVERSE LINK FEEDBACK FOR INTERFERENCE CONTROL IN A WIRELESS COMMUNICATION SYSTEM

CROSS-REFERENCE

This application claims the benefit of U.S. Provisional Application Ser. No. 60/843,034, filed Sep. 8, 2006, and entitled "REVERSE LINK FEEDBACK FOR INTERFERENCE CONTROL IN A WIRELESS COMMUNICATION SYSTEM," the entirety of which is incorporated herein by reference.

BACKGROUND

I. Field

The present disclosure relates generally to wireless communications, and more specifically to techniques for power and interference control in a wireless communication system.

II. Background

Wireless communication systems are widely deployed to provide various communication services; for instance, voice, video, packet data, broadcast, and messaging services may be provided via such wireless communication systems. These systems may be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

A wireless multiple-access communication system can simultaneously support communication for multiple wireless terminals. In such a system, each terminal can communicate with one or more sectors via transmissions on the forward and reverse links. The forward link (or downlink) refers to the communication link from the sectors to the terminals, and the reverse link (or uplink) refers to the communication link from the terminals to the sectors.

Multiple terminals can simultaneously transmit on the reverse link by multiplexing their transmissions to be orthogonal to one another in the time, frequency, and/or code domain. If complete orthogonality between transmissions is achieved, transmissions from each terminal will not interfere with transmissions from other terminals at a receiving sector. However, complete orthogonality among transmissions from different terminals is often not realized due to channel conditions, receiver imperfections, and other factors. As a result, terminals often cause some amount of interference to other terminals communicating with the same sector. Furthermore, because transmissions from terminals communicating with different sectors are typically not orthogonal to one another, each terminal may also cause interference to terminals communicating with nearby sectors. This interference results in a decrease in performance at each terminal in the system. Accordingly, there is a need in the art for effective techniques to mitigate the effects of interference in a wireless communication system.

SUMMARY

The following presents a simplified summary of the disclosed embodiments in order to provide a basic understanding of such embodiments. This summary is not an extensive overview of all contemplated embodiments, and is intended to neither identify key or critical elements nor delineate the scope of such embodiments. Its sole purpose is to present some concepts of the disclosed embodiments in a simplified form as a prelude to the more detailed description that is presented later.

The described embodiments mitigate the above-mentioned problems by providing techniques for generating, communicating, and utilizing reverse link feedback for interference management in a wireless communication system. More particularly, a terminal in a wireless communication system can obtain channel quality and/or interference data from a serving sector and one or more neighboring sectors, from which the terminal can determine a maximum transmit power that contains interference caused by the terminal to an allowable range. This interference-based maximum transmit power can then be provided with power amplifier (PA) headroom feedback to the serving sector. Based on the provided PA headroom feedback and interference-based maximum transmit power, the serving sector can then assign a transmit power for the terminal. Additionally and/or alternatively, the serving sector may choose to honor or disregard a received interference-based power value based on quality of service and/or other system parameters.

According to an aspect, a method for providing feedback for power control in a wireless communication system is described herein. The method can comprise determining a combined power amplifier (PA) headroom and interference value for communication with an access point. In addition, the method can include transmitting the combined value to the access point.

Another aspect relates to a wireless communications apparatus that can comprise a memory that stores data relating to a difference in channel quality between a serving sector and a dominant interference sector and data relating to a target interference level. The wireless communications apparatus can also include a processor configured to compute a combined PA headroom and interference value based at least in part on the difference in channel quality and the target interference level and to instruct transmission of the combined value to the serving sector.

Yet another aspect relates to an apparatus that facilitates reverse link power control and interference management in a wireless communication system. The apparatus can include means for computing one or more interference-based headroom parameters for communication with a serving base station. Further, the apparatus can include means for communicating the one or more interference-based headroom parameters to the serving base station with PA headroom feedback.

Still another aspect relates to a computer-readable medium that can comprise code for causing a computer to determine a PA headroom parameter and an interference-based headroom parameter. The computer-readable medium can further include code for causing a computer to communicate the PA headroom parameter and the interference-based headroom parameter to an access point.

According to another aspect, an integrated circuit is described herein that can execute computer-executable instructions for interference control in a wireless communication system. These instructions can include obtaining a maximum per-user interference and a path loss to at least one sector in the wireless communication system. The instructions can further include computing a combined PA headroom and interference value based at least in part on the maximum per-user interference and the path loss. In addition, the instructions can comprise transmitting the combined value to a serving sector.

According to yet another aspect, a method for conducting power control and interference management in a wireless communication system is described herein. The method can comprise receiving a combined PA headroom and interference value from an access terminal. The method can additionally include assigning one or more of a transmit power and a bandwidth for the access terminal based at least in part on the combined value.

Another aspect described herein relates to a wireless communications apparatus that can include a memory that stores data relating to a PA headroom parameter and an interference-based headroom parameter received from a terminal. In addition, the wireless communications apparatus can comprise a processor configured to assign a transmit power for the terminal based on at least one of the PA headroom parameter and the interference-based headroom parameter.

Yet another aspect relates to an apparatus that facilitates reverse link power control and interference management in a wireless communication system. The apparatus can comprise means for receiving PA headroom feedback and interference-based headroom feedback from a mobile terminal. Further, the apparatus can comprise means for assigning resources to the mobile terminal for communication based on one or more of the PA headroom feedback and the interference-based headroom feedback.

Still another aspect relates to a computer-readable medium that can comprise code for causing a computer to determine a transmit PSD to be utilized by an access terminal based at least in part on a combined PA headroom and interference value received from the access terminal. The computer-readable medium can further include code for causing a computer to communicate the transmit PSD to the access terminal.

A further aspect described herein relates to an integrated circuit that can execute computer-executable instructions for power control and interference management in a wireless communication system. These instructions can comprise receiving a PA headroom value from a terminal, the PA headroom value limited by an interference value on a reverse link. The instructions can further comprise generating an assignment of resources for use by the terminal based on the PA headroom value and the interference value. In addition, the instructions can include communicating the assignment of resources to the terminal on a forward link.

To the accomplishment of the foregoing and related ends, one or more embodiments comprise the features hereinafter fully described and particularly pointed out in the claims. The following description and the annexed drawings set forth in detail certain illustrative aspects of the disclosed embodiments. These aspects are indicative, however, of but a few of the various ways in which the principles of various embodiments may be employed. Further, the disclosed embodiments are intended to include all such aspects and their equivalents.

DETAILED DESCRIPTION

Figure 1:
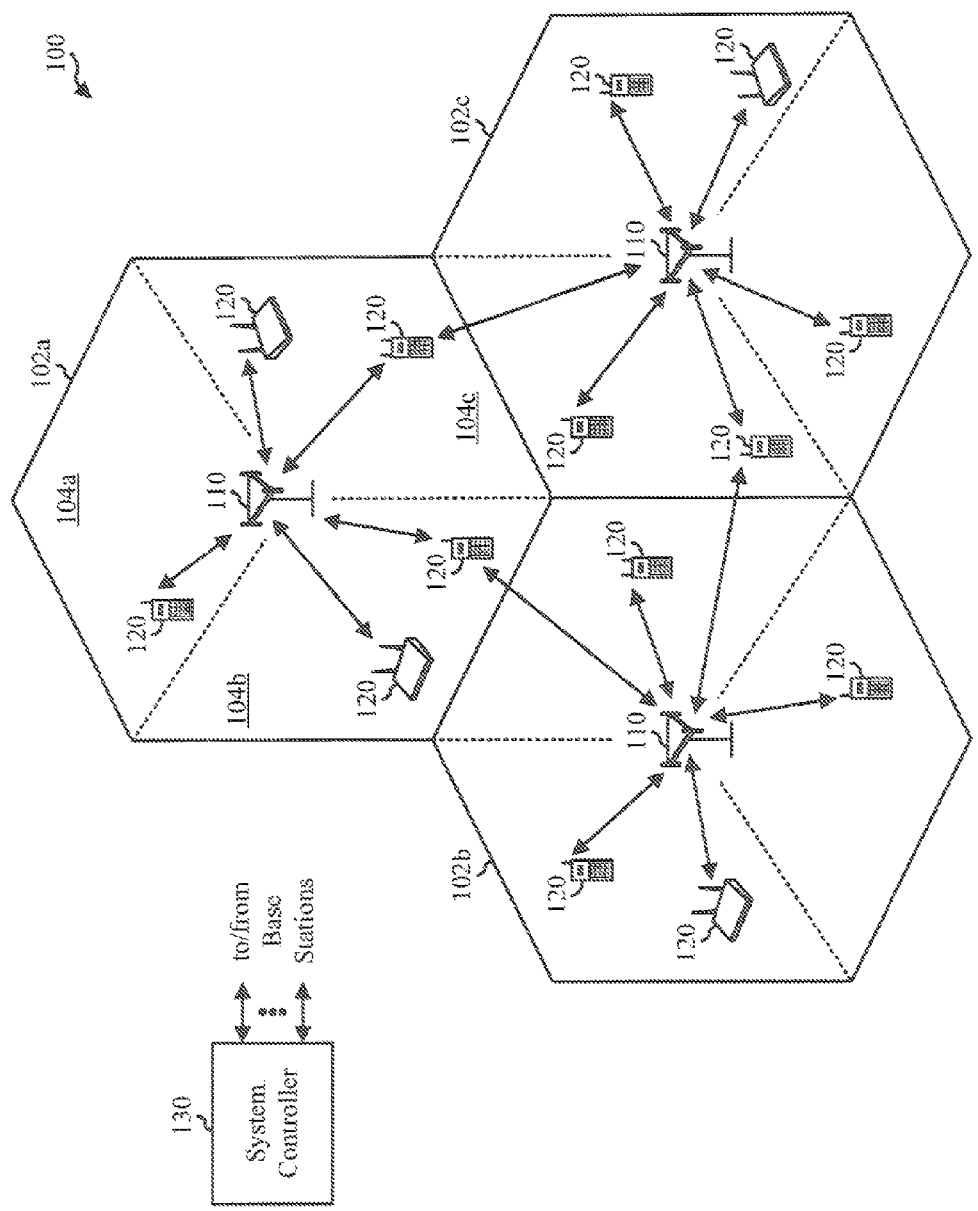
FIG. 1 illustrates a wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal and/or a base station. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) may refer to a device in an access network that communicates over the air-interface, through one or more sectors, with wireless terminals. The base station may act as a router between the wireless terminal and the rest of the access network, which may include an Internet Protocol (IP) network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 may be an access point, a Node B, and/or another appropriate network entity. Each base station 110 provides communication coverage for a particular geographic area 102. As used herein and generally in the art, the term "cell" can refer to a base station 110 and/or its coverage area 102 depending on the context in which the term is used.

To improve system capacity, the coverage area 102 corresponding to a base station 110 may be partitioned into multiple smaller areas (e.g., areas 104a, 104b, and 104c). Each of the smaller areas 104a, 104b, and 104c may be served by a respective base transceiver subsystem (BTS, not shown). As used herein and generally in the art, the term "sector" can refer to a BTS and/or its coverage area depending on the context in which the term is used. In one example, sectors 104 in a cell 102 can be formed by groups of antennas (not shown) at base station 110, where each group of antennas is responsible for communication with terminals 120 in a portion of the cell 102. For example, a base station 110 serving cell 102a may have a first antenna group corresponding to sector 104a, a second antenna group corresponding to sector 104b, and a third antenna group corresponding to sector 104c. However, it should be appreciated that the various aspects disclosed herein may be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein may refer both to a station that serves a sector as well as a station that serves a cell. As further used herein, a "serving" access point is one with which a given terminal communicates, and a "neighbor" access point is one with which a given terminal is not in communication. While the following description generally relates to a system in which each terminal communicates with one serving access point for simplicity, it should be appreciated that terminals can communicate with any number of serving access points.

In accordance with one aspect, terminals 120 may be dispersed throughout the system 100. Each terminal 120 may be stationary or mobile. By way of non-limiting example, a terminal 120 may be an access terminal (AT), a mobile station, user equipment, a subscriber station, and/or another appropriate network entity. A terminal 120 may be a wireless device, a cellular phone, a personal digital assistant (PDA), a wireless modem, a handheld device, or another appropriate device. Further, a terminal 120 may communicate with any number of base stations 110 or no base stations 110 at any given moment.

In another example, the system 100 can utilize a centralized architecture by employing a system controller 130 that can be coupled to one or more base stations 110 and provide coordination and control for the base stations 110. In accordance with alternative aspects, system controller 130 may be a single network entity or a collection of network entities. Additionally, the system 100 may utilize a distributed architecture to allow the base stations 110 to communicate with each other as needed. In one example, system controller 130 can additionally contain one or more connections to multiple networks. These networks may include the Internet, other packet based networks, and/or circuit switched voice networks that may provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler may reside in each individual cell 102, each sector 104, or a combination thereof.

In one example, system 100 may utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 120 are orthogonalized by transmitting in different time intervals. FDMA utilizes frequency division multiplexing (FDM), wherein transmissions for different terminals 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which may be modulated with data. Typically, modulation symbols are sent in the frequency domain with OFDM and in the time domain with SC-FDM. Additionally and/or alternatively, the system bandwidth can be divided into one or more frequency carriers, each of which may contain one or more subcarriers. System 100 may also utilize a combination of multiple-access schemes, such as OFDMA and CDMA. While the power control techniques provided herein are generally described for an OFDMA system, it should be appreciated that the techniques described herein can similarly be applied to any wireless communication system.

In another example, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

In accordance with one aspect, system 100 can employ centralized scheduling via one or more schedulers implemented at, for example, system controller 130 and/or each base station 110. In a system utilizing centralized scheduling, scheduler(s) can rely on feedback from terminals 120 to make appropriate scheduling decisions. In one example, this feedback can include power amplifier (PA) headroom feedback in order to allow the scheduler to estimate a supportable reverse link peak rate for a terminal 120 from which such feedback is received and to allocate system bandwidth accordingly.

In accordance with another aspect, reverse link interference control can be used by system 100 to guarantee minimum system stability and quality of service (QoS) parameters for the system. For example, decoding error probability of reverse link (RL) acknowledgement messages can be used by system 100 as an error floor for all forward link transmissions. By employing tight interference control on the RL, system 100 can facilitate power efficient transmission of control and QoS traffic and/or other traffic with stringent error requirements.

Figure 2:
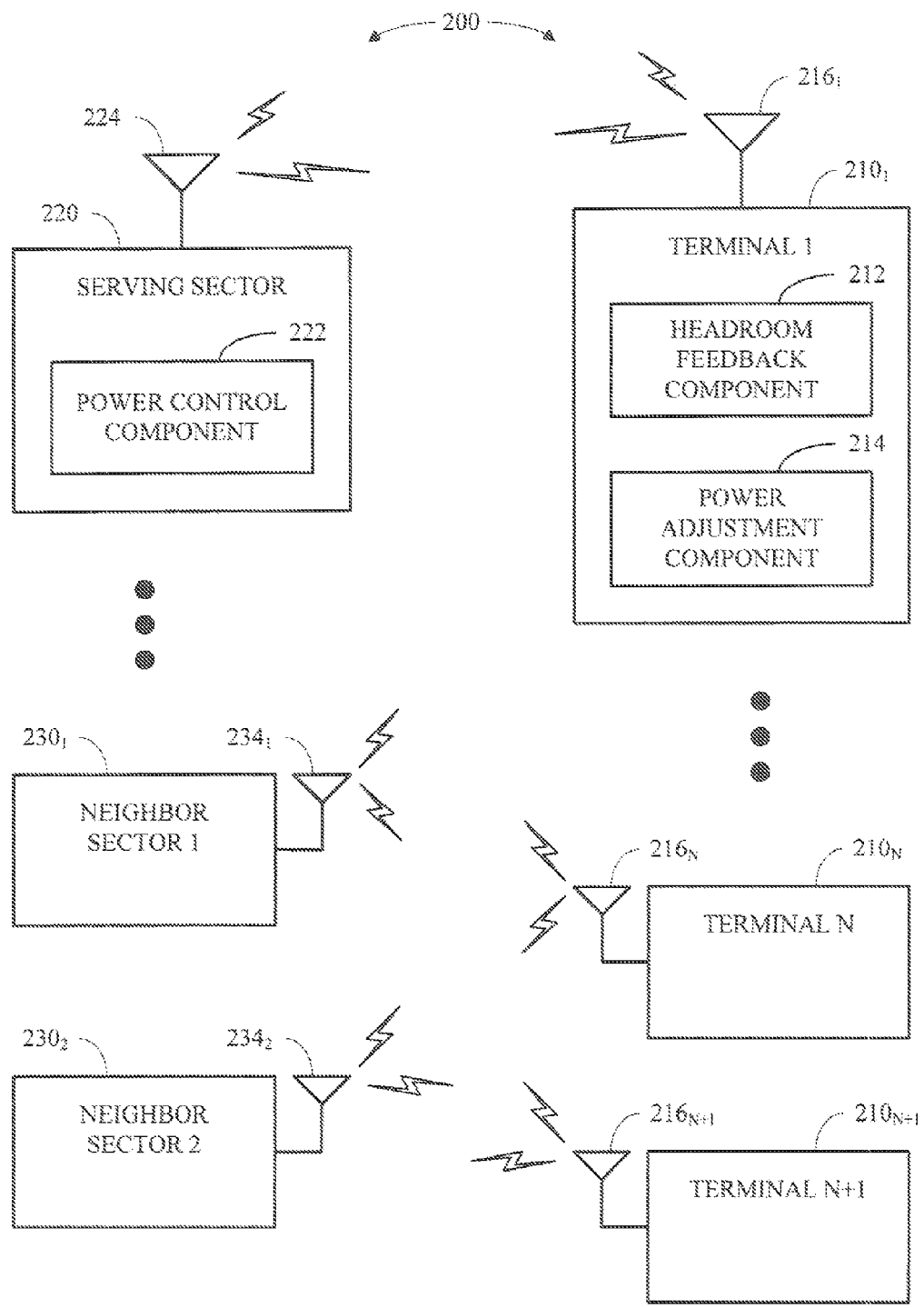
FIG. 2 is a block diagram of a system that facilitates reverse link power control and interference management in a wireless communication system in accordance with various aspects.

FIG. 2 is a block diagram of a system 200 that facilitates reverse link power control and interference management in a wireless communication system in accordance with various aspects described herein. In one example, system 200 includes a terminal $210_1$ that can communicate with a serving sector 220 on the forward and reverse links via one or more antennas 216, at terminal $210_1$ and one or more antennas 224 at serving sector 220. Serving sector 220 can be a base station (e.g., a base station 110) or an antenna group at a base station. Further, serving sector 220 can provide coverage for a cell (e.g. a cell 102) or an area within a cell (e.g. a sector 104). In addition, system 200 can include one or more neighbor sectors 230 that are not in communication with terminal $210_1$. Neighbor sectors 230 can provide coverage for respective geographic areas that can include all, part, or none of an area covered by serving sector 220 via one or more antennas 234.

Further, system 200 can include any number of additional terminals 210, which may communicate with serving sector 220 and/or one or more neighbor sectors 230 via antennas 216.

In accordance with one aspect, a terminal 210 and a serving sector 220 can communicate to control the amount of transmit power used by the terminal 210 in communicating with the serving sector 220 via one or more power control techniques. In one example, a terminal 210 can include a headroom feedback component 212 that can report a total amount of transmit power available at the terminal to a serving sector 220. This report can be communicated to the serving sector as, for example, power amplifier (PA) headroom feedback and/or another suitable form of feedback from the terminal 210. By way of specific example, PA headroom feedback provided by a terminal 210 can correspond to headroom with respect to a pilot channel on which the terminal is transmitting, a maximum bandwidth supportable by the terminal at a nominal power spectral density (PSD), and/or a maximum PSD achievable by the terminal.

At the serving sector 220, a power control component 222 can then utilize the PA headroom feedback and/or other feedback from a terminal 210 to assign a transmit power to the terminal 210. In one example, PA headroom feedback received at a serving sector 220 from a terminal 210 can correspond to a maximum available transmit power at the terminal 210. Accordingly, a power control component 222 at a serving sector 220 can utilize PA headroom feedback from a terminal 210 to ensure that an assigned transmit power level does not exceed the maximum transmit power indicated in the PA headroom feedback. After the power control component 222 generates a transmit power assignment, the serving sector 220 can transmit the assignment back to the terminal 210. The terminal 210 can then accordingly adjust its transmit power based on the assignment via a power adjustment component 214.

In accordance with another aspect, power control techniques utilized by entities in system 200 can additionally take into account interference present in system 200. For example, in a multiple access wireless communication system such as an OFDMA system, multiple terminals 210 may simultaneously conduct uplink transmission by multiplexing their transmissions to be orthogonal to one another in the time, frequency, and/or code domain. However, complete orthogonality between transmissions from different terminals 210 is often not achieved due to channel conditions, receiver imperfections, and other factors. As a result, terminals 210 in system 200 will often cause interference to other terminals 210 communicating with a common sector 220 or 230. Furthermore, because transmissions from terminals 210 communicating with different sectors 220 and/or 230 are typically not orthogonal to one another, each terminal 210 may also cause interference to terminals 210 communicating with nearby sectors 220 and/or 230. As a result, the performance of terminals 210 in system 200 can be degraded by the interference caused by other terminals 210 in system 200.

Accordingly, to provide the ability for a serving sector 220 to accurately decode a transmission from a terminal 210 while maintaining an acceptable level of interference, entities in system 200 can perform one or more interference-based power control algorithms. In one example, terminal 210, and serving sector 220 can communicate to carry out a delta-based power control algorithm. More particularly, a delta-based power control algorithm is designed for a channel, e.g. a data channel, where the delta refers to relative power spectral density (PSD), or a similar metric, which is offset relative to a fixed channel such as a channel quality feedback or access/request channel. In another example, the fixed channel utilized in the delta-based power control algorithm can have a minimum decode error rate target that must be met to ensure proper operation of system 200. The difference between the PSD of the channel for which the delta-based power control algorithm is being utilized and the fixed channel PSD can then be adjusted depending on erasure thresholds, carrier-to-interference ratios, interference offsets, and/or other factors.

In accordance with another aspect, the amount of inter-cell interference caused by a given terminal 210 can be determined by the transmit power level used by the terminal 210 and the location of the terminal 210 relative to neighbor sectors 230. Based on this, power control can be performed in system 200 such that each terminal 210 is allowed to transmit at a power level that is as high as possible while keeping intra-cell and inter-cell interference to within acceptable levels. For example, a terminal 210 located closer to its serving sector 220 may be allowed to transmit at a higher power level since the terminal will likely cause less interference to neighbor sectors 230. Conversely, a terminal 210 located farther away from its serving sector 220 and toward a sector edge may be restricted to a lower transmit power level since the terminal may cause more interference to neighbor sectors 230. By controlling transmit power in this manner, system 200 can reduce the total interference observed by sectors 220 and/or 230 while allowing "qualified" terminals 210 to achieve higher SNRs and thus higher data rates.

Figure 3A:
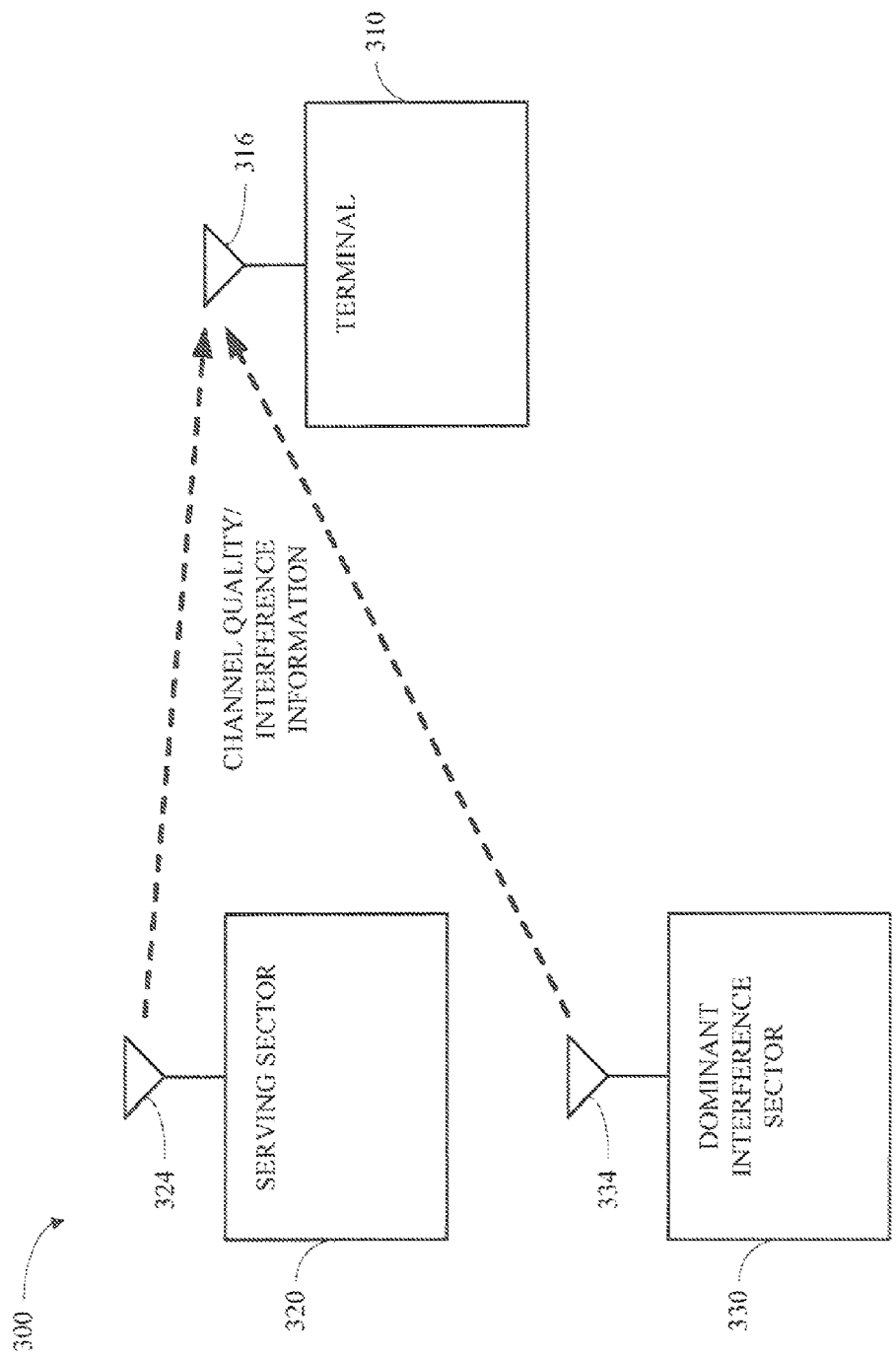
FIGS. 3A-3C illustrate operation of an example system for power control and interference management in a wireless communication system in accordance with various aspects.
Figure 3B:
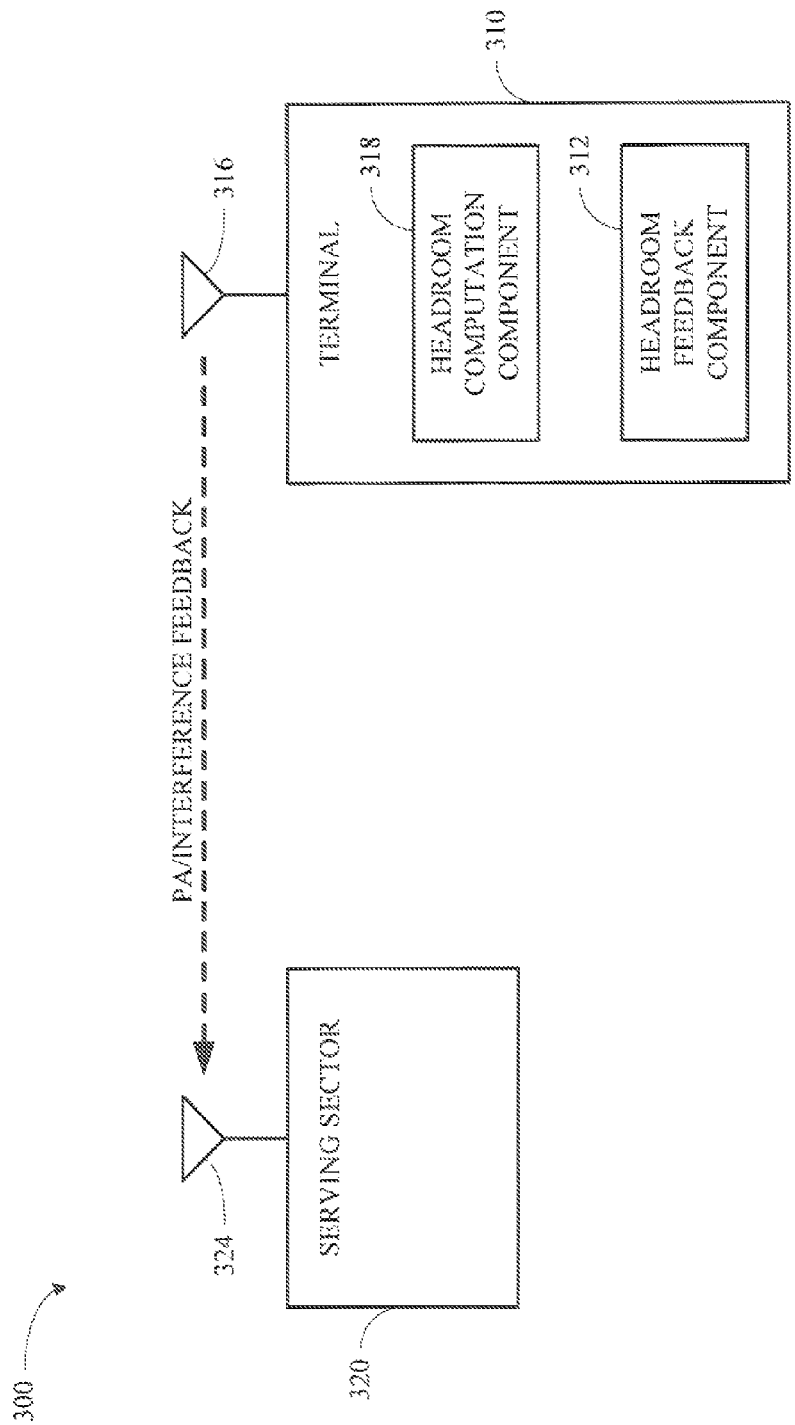
Figure 3C:
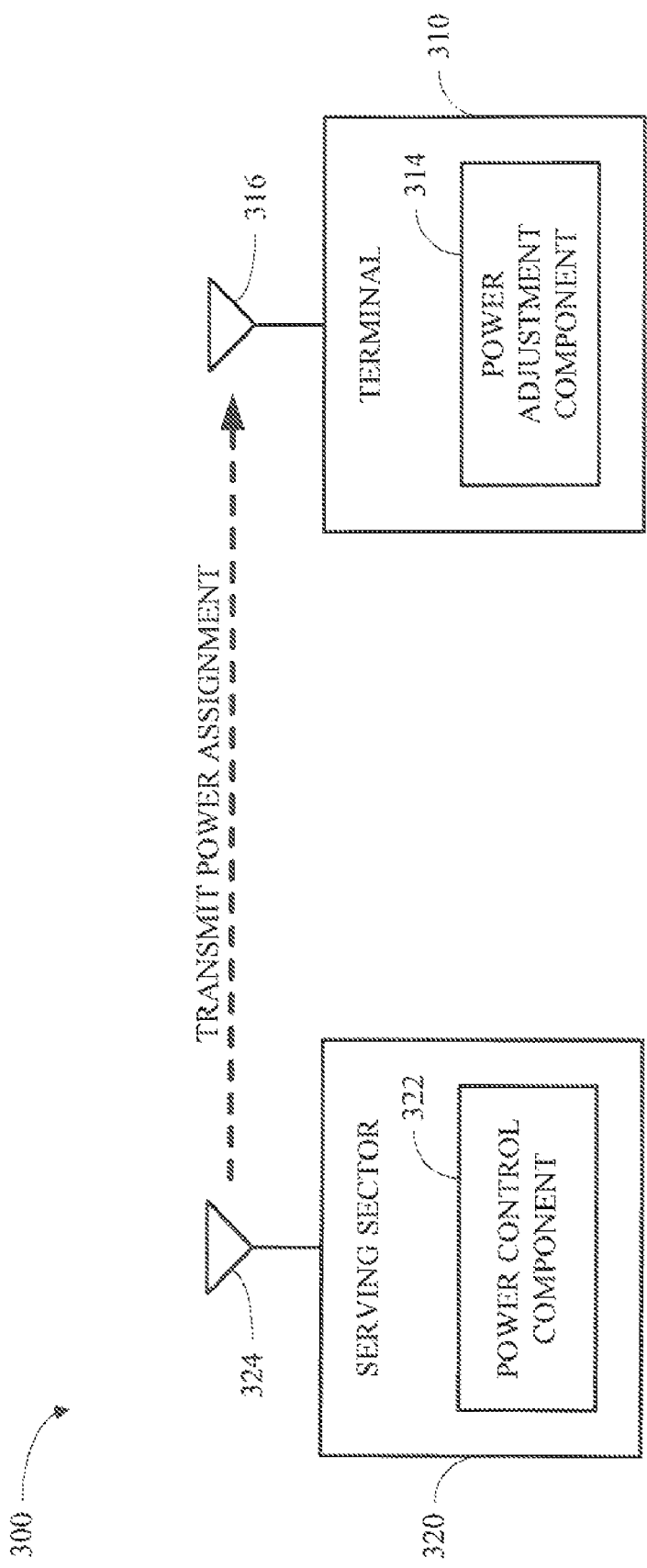

FIGS. 3A-3C are block diagrams that illustrate operation of an example system 300 for power control and interference management in a wireless communication system. In a similar manner to system 200, system 300 can include a terminal 310 in communication with a serving sector 320 on the forward and reverse links via respective antennas 316 and 324. System 300 can also include one or more neighbor sectors (e.g., neighbor sectors 230), which can include a dominant interference sector 330 that has the most potential of being affected by interference caused by terminal 310 due to, for example, being the closest neighbor sector to terminal 310.

In accordance with one aspect, terminal 310 can communicate with serving sector 320 to control transmit power levels utilized by terminal 310. In one example, power control techniques utilized by terminal 310 and serving sector 320 can be based on a level of interference caused by terminal 310 at serving sector 320 and/or other sectors such as dominant interference sector 330. More particularly, terminal 310 can determine channel quality parameters for serving sector 320 and/or dominant interference sector 330, from which terminal 310 can compute an interference value. The interference value can then be communicated to serving sector along with PA headroom feedback on the reverse link, based on which serving sector 320 can assign a transmit power level for terminal 310. By utilizing interference as a factor in power control techniques employed by terminal 310 and serving sector 320, such techniques can facilitate more optimal overall performance in system 300 than similar techniques that do not take interference into account.

In accordance with another aspect, interference-based power control can be performed in system 300 using various techniques in order to increase overall performance of entities therein. In one such technique, transmit Power Spectral Density (PSD) for a data channel, or another suitable channel having a power offset based upon another channel, can be expressed for a given terminal 310 as follows:

$$P_{dch}(n) = P_{ref}(n) + \Delta P(n), \quad (1)$$

where $P_{dch}(n)$ is the transmit PSD for the data channel for an update interval n, $P_{ref}(n)$ is a reference PSD level for update interval n, and $\Delta P(n)$ is a transmit PSD delta for update interval n. The PSD levels $P_{dch}(n)$ and $P_{ref}(n)$ and the transmit power delta $\Delta P(n)$ can be given in units of decibels (dB/Hz), although other units can be utilized. Further, it should be appreciated that calculations other than that given by Equation (1) can also be utilized. In one example, the reference PSD level $P_{ref}(n)$ corresponds to the amount of transmit PSD needed to achieve a target signal-to-noise ratio (SNR) or erasure rate for a designated transmission. The transmission can be provided by a fixed channel such as, for example, a channel quality feedback channel or a request channel. If a reference power level is capable of achieving the corresponding target SNR or erasure rate, then the received SNR for the other channel may be estimated as follows:

$$SNR_{dch}(n) = SNR_{target} + \Delta P(n) \quad (2)$$

In one example, a data channel and a corresponding control channel utilized by entities in system 300 can have similar interference statistics. This can occur, for example, when control and data channels from different sectors interfere with one another. In such a case, the interference offset for the channels may be calculated at terminal 310. Alternatively, the interference offset between the control channels and data channels can be broadcasted by one or more sectors 320 and/or 330.

In another example, a transmit PSD for a data channel can be set based on factors such as, for example, an amount of inter-sector interference terminal 310 is potentially causing to other terminals in neighboring sectors (e.g., sectors 104), an amount of intra-sector interference terminal 310 is potentially causing to other terminals in the same sector, a maximum allowable transmit power level for terminal 310, and/or other factors. These factors are described in more detail infra with reference to power control techniques illustrated by FIGS. 3A-C.

With reference to FIG. 3A, initial forward link communications from sectors 320 and 330 to terminal 310 in system 300 and measurements made at terminal 310 based on those communications for an interference-based power control algorithm are illustrated. In accordance with one aspect, terminal 310 can receive data and/or signaling from serving sector 320 on the forward link. In one example, signaling received from serving sector 320 includes an indication of channel quality from terminal 310 to serving sector 320 on the reverse link. Additionally and/or alternatively, terminal 310 can obtain forward link channel quality based on data, pilots, and/or other signaling sent by serving sector 320 on the forward link.

In accordance with another aspect, dominant interference sector 330 can transmit interference indicators and/or other signaling to terminal 310 on the forward link via one or more antennas 334. Interference indicators transmitted by dominant interference sector 330 can include an indication of reverse link interference present at dominant interference sector 330. Additionally and/or alternatively, terminal 310 can obtain forward link channel quality relative to dominant interference sector 330 based on the indicators and/or other signaling received therefrom. Based on channel quality and/or interference information received by terminal 310, a difference in channel quality between serving sector 320 and dominant interference sector 330 can then be determined by terminal 310 and utilized for further power control computation.

In another example, channel quality information obtained by terminal 310 from serving sector 320 and/or dominant interference sector 330 can include path loss information from an access point corresponding to the coverage area of the access point. Path loss information can be derived from forward link pilot measurement at terminal 310, reverse link path loss feedback from an access point, and/or other appropriate sources. For example, a forward link pilot quality indicator channel (PQICH) from an access point can be used by terminal 310 as a source of path loss information.

Terminal 310 can utilize the information received from serving sector 320 and/or dominant interference sector 330 to determine the amount of inter-sector interference terminal 310 is potentially causing in various manners. In one example, the amount of inter-sector interference caused by terminal 310 can be directly estimated dominant interference sector 330 and/or other neighbor access points (e.g., neighbor sectors 230) in system 300. These directly estimated values can then be sent to terminal 310 in order to allow terminal 310 to adjust its transmit power accordingly.

Alternatively, the amount of inter-sector interference caused by terminal 310 can be roughly estimated based on the total interference observed by dominant interference sector 320 and/or neighbor access points; channel gains for serving sector 320, dominant interference sector 330, and/or neighbor access points; and a transmit power level used by terminal 310. In one example, access points in system 300 can estimate a total or average currently observed amount of interference observed by the access point. The access points can then broadcast these interference measurements for use by terminals in other sectors. By way of non-limiting example, a single other-sector interference (OSI) bit can be used by each access point to provide interference information. Accordingly, each access point may set its OSI bit (OSIB) as follows:

$$OSIB(N) = \begin{cases} \text{'1', if } IOT_{meas,m}(n) \geq IOT_{target}, \text{ and} \\ \text{'0', if } IOT_{meas,m}(n) < IOT_{target}, \end{cases} \quad (3)$$

where $IOT_{meas,m}(n)$ is the measured interference-over-thermal (IOT) value for an m-th sector at a time interval n and $IOT_{target}$ is a desired operating point for the sector. As used in Equation (3), IOT refers to a ratio of the total interference power observed by an access point to thermal noise power. Based on this, a specific operating point may be selected for the system and denoted as $IOT_{target}$. In one example, OSI can be quantized into multiple levels and accordingly comprise multiple bits. For example, an OSI indication can have two levels, such as $IOT_{MIN}$ and $IOT_{MAX}$, such that if an observed IOT is between $IOT_{MIN}$ and $IOT_{MAX}$ no adjustment to transmit power at a terminal 310 is to be made and if the observed IOT is above or below the given levels transmit power should be accordingly adjusted upward or downward.

In accordance with one aspect, terminal 310 can estimate channel gain or propagation path gain for access points that may receive reverse link transmission from the terminal. The channel gain for each of the access points can be estimated by processing a pilot received from the access points on the forward link. In one example, a channel gain ratio between serving sector 320 and a neighbor access point such as dominant interference sector 330 can be utilized as a "relative distance" indicative of a distance to dominant interference sector 330 relative to a distance to serving sector 320. It can be observed that a channel gain ratio for a neighbor access point will generally decrease as terminal 310 moves toward a sector edge corresponding to serving sector 320 and generally increase as terminal 310 moves closer to serving sector 320.

Once terminal 310 obtains channel quality and/or interference information as illustrated by FIG. 3A, terminal 310 can calculate a maximum allowable transmit power based on interference experienced by various entities in system 300 and communicate this value back to serving sector 320 as illustrated in FIG. 3B. In one example, terminal 310 can include a headroom computation component 318 for computing a maximum allowable transmit power value based on PA headroom of terminal 310 and/or interference terminal 310 is causing at access points in system 300. In one specific, non-limiting example, headroom computation component 318 can utilize a difference in channel quality obtained from serving sector 320 and dominant interference sector 330 as illustrated by FIG. 3A and a target interference level that terminal 310 can cause at a neighboring sector to determine an interference-based maximum allowable transmit power. While headroom computation component 318 is illustrated in FIG. 3B as a component of terminal 310, it should be appreciated that serving sector 320 and/or another suitable network entity can also perform some or all of the calculations performed by headroom computation component 318 either independently of or in cooperation with terminal 310. The target interference level utilized by headroom computation component 318 can be, for example, a predetermined rise over the thermal noise power of system 300 (e.g., a predetermined dB rise), a predetermined rise over an interference level observed at a sector, or a multiple of system thermal noise power. Further, the target interference level can be pre-configured or dynamically set by terminal 310, serving sector 320, and/or another entity in system 300. In another example, calculations performed by headroom computation component 318 can be dynamic based on loading of serving sector 320, the observed channel quality difference between serving sector 320 and dominant interference sector 330, interference information received from serving sector 320, dominant interference sector 330, and/or other access points in system 300, types of content to be transmitted between serving sector 320 and terminal 310 (e.g., voice, video, messaging data, etc.) and the sensitivity of such types of content to interference, and/or other factors.

In accordance with one aspect, headroom computation component 318 can monitor OSI bits broadcast by neighbor access points in system 300 and can be configured to only respond to an OSI bit of a dominant interference sector 330, which can have the smallest channel gain ratio of the neighbor access points. In one example, if the OSI bit of dominant interference sector 330 is set to '1,' due to, for example, the access point observing higher than nominal inter-sector interference, then headroom computation component 318 can accordingly adjust the maximum allowable transmit power of terminal 310 downward. Conversely, if the OSI bit of dominant interference sector 330 is set to '0,' headroom computation component 318 can adjust the maximum allowable transmit power of terminal 310 upward. Thus, an OSI bit from dominant interference sector 330 can determine the direction in which headroom computation component 318 adjusts the transmit power of terminal 310. Headroom computation component 318 can then determine a magnitude of transmit power adjustment for terminal 310 based on a current transmit power level and/or transmit power delta for terminal 310, the channel gain ratio for dominant interference sector 330, and/or other factors. Alternatively, headroom computation component 318 can utilize OSI bits from more than one access point and can utilize various algorithms to adjust the maximum allowable transmit power of terminal 310 based on the multiple received OSI bits.

In accordance with another aspect, data channels utilized by each sector in system 300 can be multiplexed such that they are orthogonal to one another. However, despite such multiplexing, some loss in orthogonality can result from inter-carrier interference (ICI), inter-symbol interference (ISI), and/or other causes, from which intra-sector interference can result. To mitigate intra-sector interference, the transmit PSD of terminal 310 may be controlled by headroom computation component 318 such that the amount of intra-sector interference that terminal 310 may cause to other terminals in the same sector is maintained within an acceptable level. This may be achieved, for example, by constraining the transmit PSD delta, $\Delta P(n)$, to be within a corresponding range $\Delta P(n) \in [\Delta P_{min}, \Delta P_{max}]$, where $\Delta P_{min}$ and $\Delta P_{max}$ are respectively the minimum and maximum transmit PSD deltas allowable for a given data channel.

In accordance with another aspect, terminal 310 can include a headroom feedback component 312, which can send a transmit PSD delta computed by headroom computation component 318 and a maximum number of subbands that terminal 310 can support at the current transmit PSD delta, $N_{sb,max}(n)$, to serving sector 320. In addition, desired quality of service (QoS) and buffer size parameters can also be transmitted to serving sector 320 by headroom feedback component 312. To reduce the amount of required signaling, headroom feedback component 312 can transmit $\Delta P(n)$ and $N_{sb,max}(n)$ at a subset of update intervals via in-band signaling on a data channel and/or by other means. It should be appreciated that a low transmit PSD delta corresponding to terminal 310 does not mean that terminal 310 is not using all of the resources available to it. Instead, terminal 310 can be given more subbands for transmission in order to use all its available transmit power.

In one example, PA headroom can be computed by headroom computation component 318 as a ratio of total power available at terminal 310 to pilot transmit power. Alternatively, headroom computation component 318 can compute PA headroom as a maximum bandwidth parameter, which can be set by overhead parameters received from serving sector 320 corresponding to a nominal transmit PSD. In such an example, headroom information can be incorporated into maximum bandwidth feedback provided to serving sector 320 by headroom feedback component 312, which can be computed by headroom computation component 318 as a ratio of total power to a delta setting obtained from a delta-based power control algorithm. In addition, similar information can be incorporated into PSD constraints or relative channel/interference feedback utilized by terminal 310 and serving sector 320. For example, a delta setting in a delta-based power control algorithm utilized by system 300 can be modified to reflect a maximum per-user interference target.

Headroom feedback component 312 can provide PA headroom feedback combined with interference information to serving sector 320 in a variety of ways. For example, such information can be provided to serving sector 320 via a medium access control (MAC) header of a packet, such as a control channel packet; in a separate physical channel, such as a channel for interference or power control feedback; as part of channel state information feedback (e.g. as one or more bits of the channel state information); and/or by other suitable means.

Based on the feedback provided to serving sector 320 by terminal 310 as illustrated by FIG. 3B, serving sector 320 can then generate a transmit power assignment for terminal 310 and communicate this assignment to terminal 310 as illustrated in FIG. 3C. In one example, a transmit power for terminal 310 can be assigned by a power control component 322 at serving sector 320. Power control component 322 can receive PA headroom feedback, interference-based parameters such as an interference-based maximum allowable transmit power, and/or other parameters from terminal 310 as illustrated in FIG. 3B for use in generating a transmit power assignment for terminal 310. Parameters utilized by power control component 322 can be received together as a common communication or in separate communications.

In accordance with one aspect, power control component 322 can determine a transmit power to be used by terminal 310 for communication with serving sector 320. Further, in one example, power control component 322 can selectively determine whether or not to honor interference-based parameters received from terminal 310 in determining its transmit power assignment. For example, power control component 322 can analyze traffic quality of service (QoS) and/or other parameters and determine whether a transmit power that is higher than an interference-based maximum transmit power provided by terminal 310, up to the transmit power capability of terminal 310 as provided by its PA headroom feedback, should be assigned to terminal 310. Power control component 322 can then assign a higher transmit power to terminal 310 accordingly. Once a transmit power assignment is determined by power control component 322, the assignment can be communicated back to terminal 310, whereupon terminal 310 can adjust its transmit power accordingly via a power adjustment component 314.

In one specific example, power control component 322 can calculate $\Delta P(n)$ and/or other parameters utilized for generating a transmit power assignment for terminal 310 based upon a reference PSD level $P_{ref}(n)$, the power of signals received on reverse link channel quality indicator and/or request channels from terminal 310, and/or other factors. In such an example, carrier-to-interference offset can be determined along with a value for (IOT–RoT). These values can then be used to offset the power of the signals reverse link channel quality indicator and/or request channels from terminal 310 and transmitted as power control commands back to terminal 310.

In another example, total interference power received over the bandwidth of system 300 can be used by power control component 322 as an interference control metric. The total interference power can be used to determine a maximum per user interference target, which can then be used to schedule terminal 310 for RL transmission in terms of bandwidth, timing, and/or other parameters. The per user interference target can be set, for example, to be a small fraction of total interference power for systems with interference vulnerable deployment. By way of non-limiting example, such a target can be utilized in a micro cell deployment since an individual terminal on a cell edge in such a deployment may have enough power to overwhelm a cell over a bandwidth of 5 or 10 MHz. In addition, such a target can be utilized in connection with cells used for communicating traffic having a significantly low latency that is susceptible to large IoT variations.

Referring to FIGS. 4-7, methodologies for power and interference control in a wireless communication system are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 4:
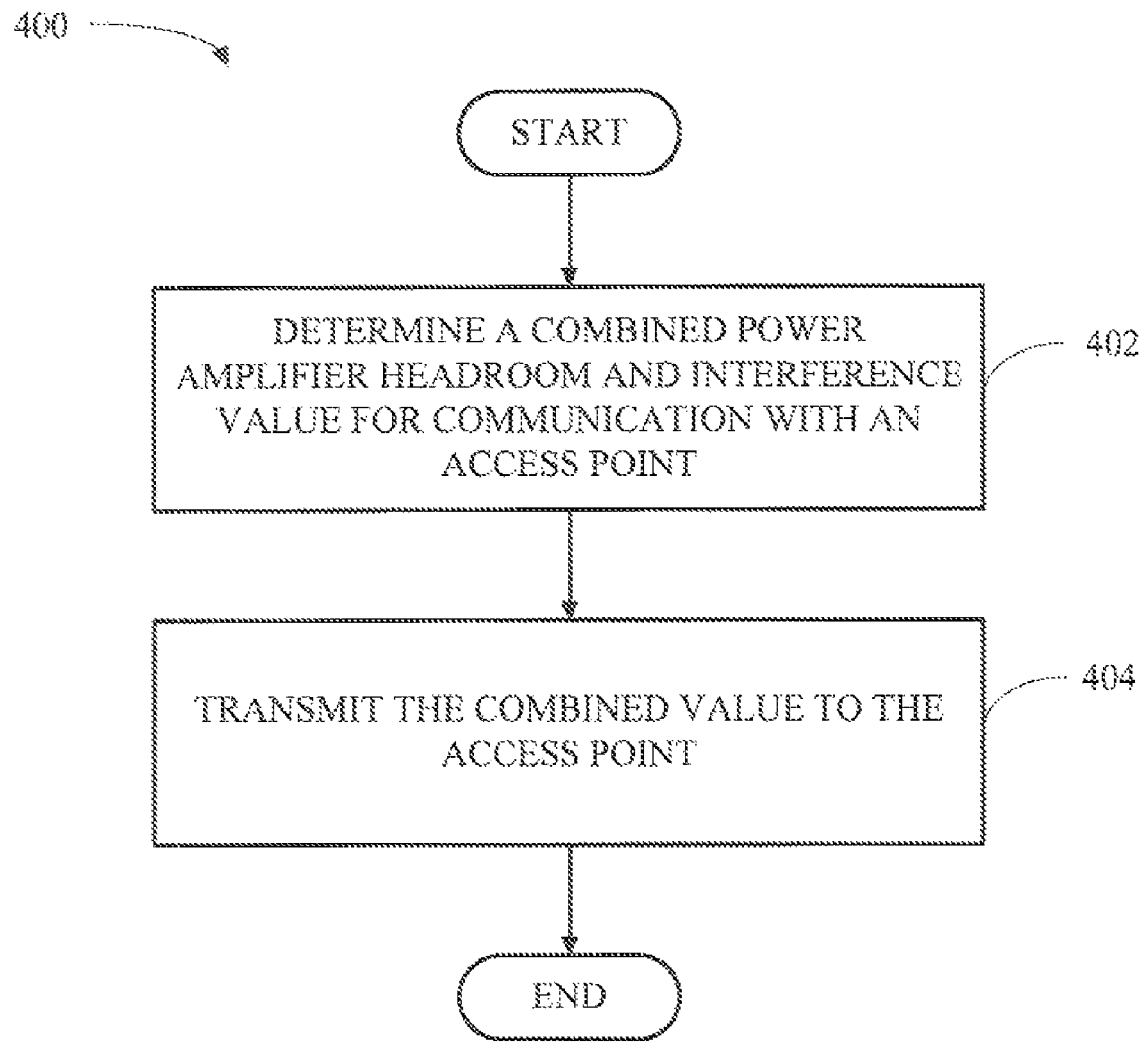
FIG. 4 is a flow diagram of a methodology for providing reverse link feedback for power control and interference management in a wireless communication system.

With reference to FIG. 4, illustrated is a methodology 400 for providing reverse link feedback for power control and interference management in a wireless communication system (e.g., system 300). It is to be appreciated that methodology 400 can be performed by, for example, a terminal (e.g., terminal 310) and/or any other appropriate network entity. Methodology 400 begins at block 402, wherein a combined PA headroom and interference value for communication with an access point (e.g. serving sector 320) is determined.

In accordance with one aspect, the PA headroom portion of the value determined at block 402 can be computed as headroom with respect to a pilot channel on which the entity performing methodology 400 is transmitting, a maximum available bandwidth based on a nominal PSD value, a maximum PSD achievable by the entity performing methodology 400, and/or other appropriate parameters. The PA headroom portion of the value determined at block 402 can then be combined with an interference-based power value, which can be determined based on channel quality and/or interference information received from a serving access point (e.g., serving sector 320) and/or neighbor access points (e.g. dominant interference sector 330 and/or other neighbor access points) in the system. In one example, the interference-based power value can be determined at block 402 based on forward link path loss information obtained from pilots and/or other information received from the serving access point and/or neighbor access points. Alternatively, the value can be computed based on reverse link path loss and/or channel quality feedback from the access points. In another example, the interference-based power value can also be determined at block 402 based on OSI information obtained from neighbor access points. For example, the power can be adjusted upward if indications of high interference are received or downward if indications of lower interference are received.

Upon completing the act described at block 402, methodology 400 continues to block 404, wherein the combined value determined at block 402 is transmitted to the access point. Transmission at block 404 can be accomplished in a variety of ways. For example, the combined value determined at block 402 can be transmitted to the access point in a MAC header of a packet and can be transmitted on a dedicated channel and/or combined with channel state information feedback. Further, the combined value determined at block 402 can be transmitted to the access point together with, separately from, or in place of PA headroom feedback that does not depend on interference observed in the system.

Figure 5:
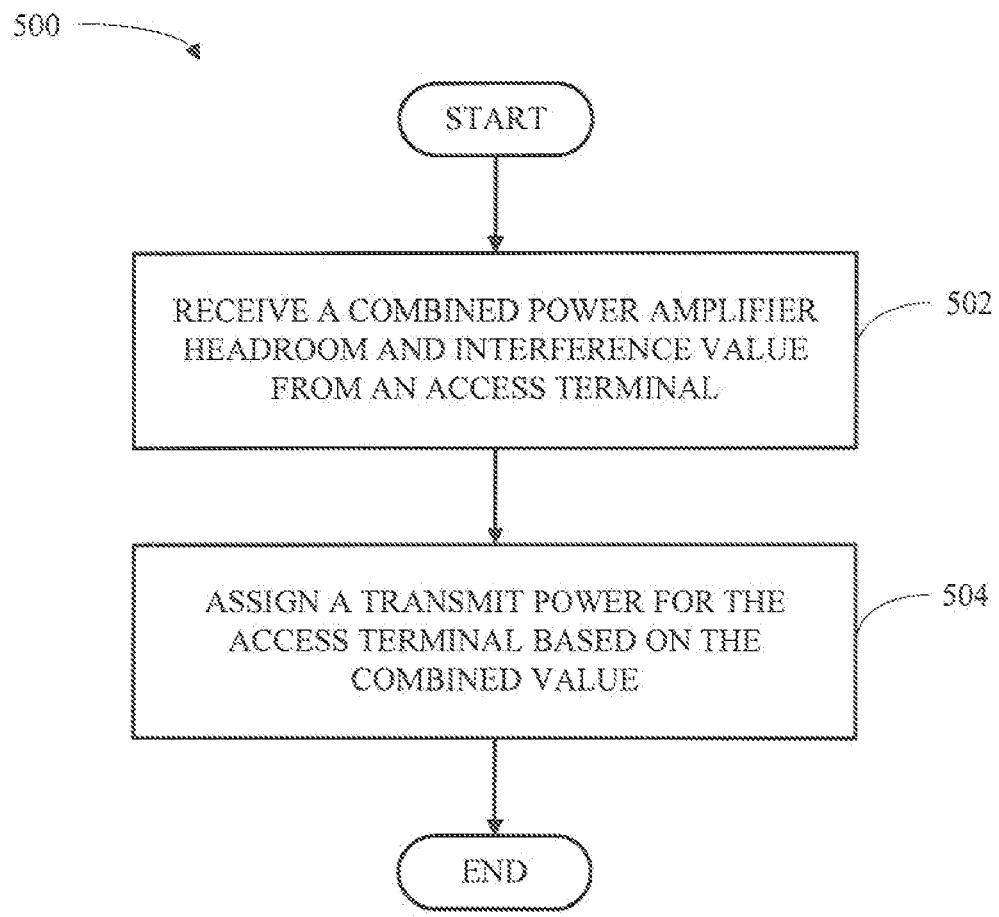
FIG. 5 is a flow diagram of a methodology for conducting reverse link power control in a wireless communication system.

FIG. 5 illustrates a methodology 500 for conducting reverse link power control in a wireless communication system. It is to be appreciated that methodology 500 can be performed by, for example, an access point (e.g., serving sector 320) and/or any other suitable network entity. Methodology 500 begins at block 502, wherein a combined PA headroom and interference value is received from an access terminal (e.g., terminal 310). In one example, the combined value received at block 502 can correspond to a maximum power level at which the access terminal can transmit while keeping interference caused by the access terminal within acceptable levels. Additionally and/or alternatively, the combined value received at block 502 can correspond to a maximum bandwidth the access terminal can support while causing an acceptable amount of interference at neighboring access points. In another example, the combined value can be received with, separate from, or in place of a PA headroom parameter from the access terminal that does not take interference into account.

Methodology 500 can then proceed to block 504, wherein a transmit power for the access terminal is assigned based on the combined value received at block 502. In one example, a transmit power can be assigned for the access terminal at block 504 such that the maximum transmit power and/or corresponding bandwidth parameter received at block 502 from the access terminal will not be exceeded. Alternatively, if a PA headroom parameter that is not based on interference is also received at block 502, quality of service and/or other parameters can be analyzed at block 504. Based on this analysis, a determination can be made at block 504 as to whether to honor or discard the combined value received at block 502 and instead use the non-interference-based PA headroom parameter as a maximum transmit power that can be assigned to the access terminal.

Figure 6:
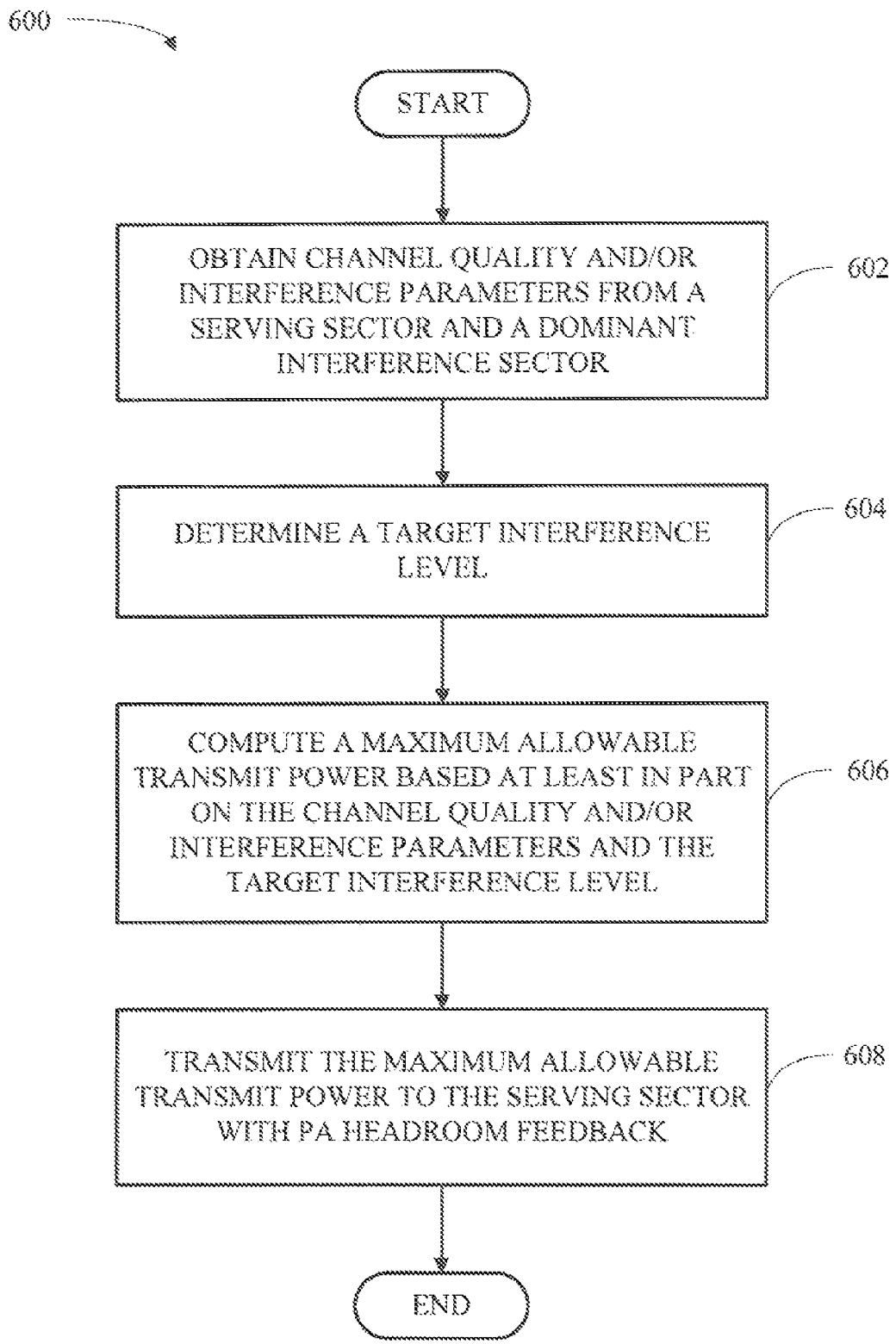
FIG. 6 is a flow diagram of a methodology for generating and transmitting reverse link feedback for power control and interference management in a wireless communication system.

FIG. 6 illustrates a methodology 600 for generating and transmitting reverse link feedback for power control and interference management in a wireless communication system. It is to be appreciated that methodology 600 can be performed by, for example, a terminal and/or any other appropriate network entity in a wireless communication system. Methodology 600 begins at blocks 602, wherein channel quality and/or interference parameters are obtained from a serving sector and a dominant interference sector. In one example, channel quality and/or interference parameters can be obtained at block 602 for the forward link by analyzing pilots and/or other information received from the serving sector and dominant interference sector on the forward link. Additionally and/or alternatively, channel quality and/or interference parameters obtained at block 602 can include reverse link channel quality and interference feedback transmitted by the sectors. Next, at block 604, a target interference level is determined. The target interference level determined at block 604 can be, for example, a predetermined rise over thermal noise power, a predetermined rise over an interference level observed at a sector, a multiple of system thermal noise power, and/or another appropriate target. Further, the target interference level can be dynamically determined at block 604 based on changes in network conditions, a type of data to be communicated, and/or other factors.

Based on the information obtained at block 602 and the target interference level determined at block 604, a maximum allowable transmit power can then be computed at block 606. In one example, the maximum allowable transmit power computed at 606 can be computed by determining a maximum transmit power and/or corresponding bandwidth that constrains the amount of interference caused by an entity performing methodology 600 at neighboring sectors within an allowable range. Once the interference-based maximum allowable transmit power is computed at block 606, methodology 600 can then conclude at block 608, wherein the interference-based transmit power is transmitted to the serving sector with PA headroom feedback. Similar to the transmission performed at block 404 of methodology 400, the interference-based transmit power computed at block 606 can be transmitted to the serving sector in a MAC header of a packet and can be transmitted on a dedicated channel and/or combined with channel state information feedback. Further, the interference-based transmit power can be combined with the PA headroom feedback prior to transmission at block 608, or alternatively the interference-based transmit power and PA headroom feedback can be transmitted as separate parameters.

Figure 7:
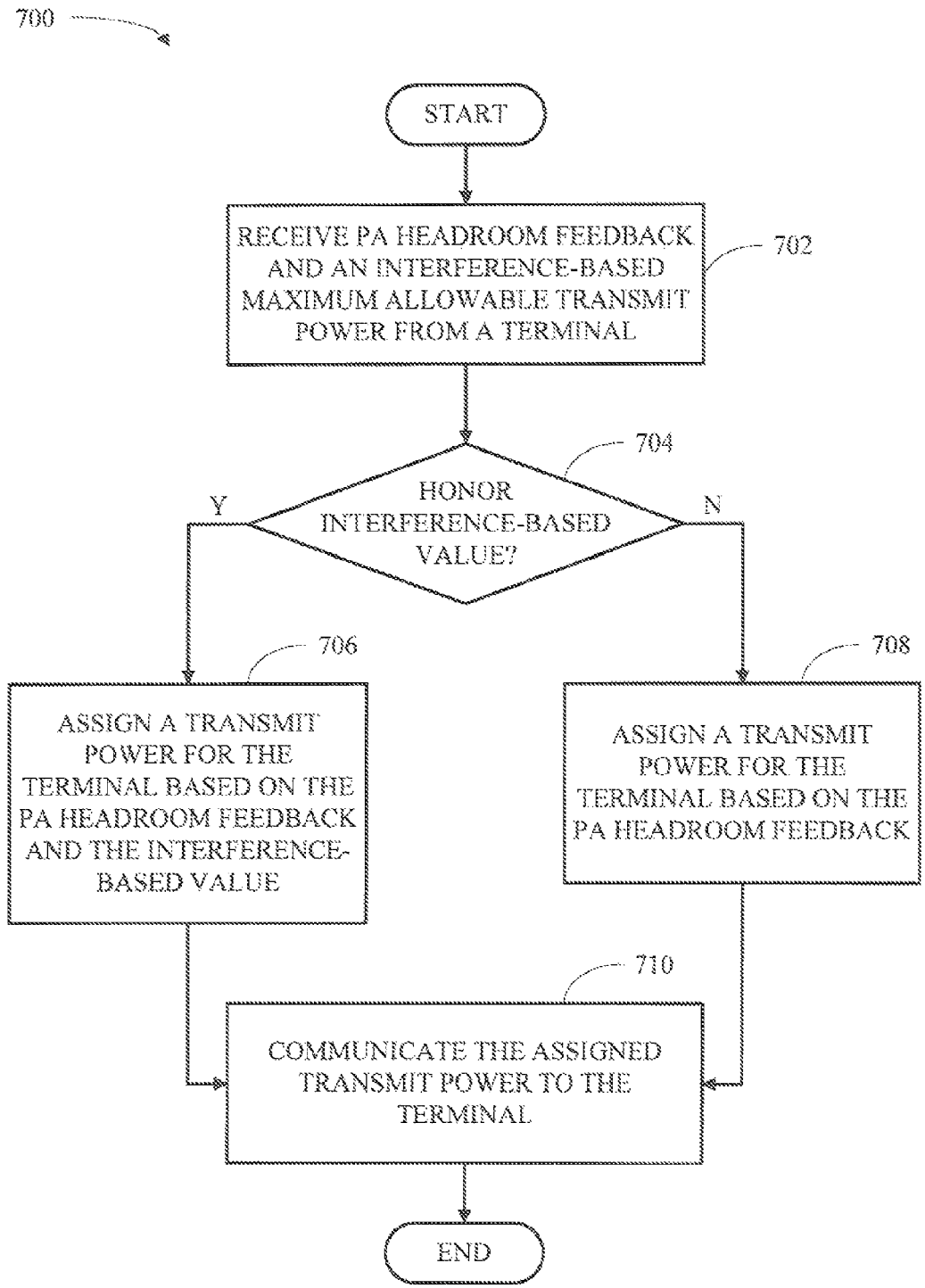
FIG. 7 is a flow diagram of a methodology for assigning a transmit power to a terminal for reverse link power control and interference management in a wireless communication system.

FIG. 7 illustrates a methodology 700 for assigning a transmit power to a terminal for reverse link power control and interference management in a wireless communication system. It is to be appreciated that methodology 700 can be performed by, for example, an access point and/or any other suitable network entity in a wireless communication system. Methodology 700 begins at block 702, wherein PA headroom feedback and an interference-based maximum allowable transmit power are received from a terminal. The PA headroom feedback and interference-based value can be received at block 702 together or as separate parameters. Further, the parameters can be received at block 702 in a MAC header of a packet, and they can be further received on a dedicated channel and/or combined with channel state information feedback from the terminal.

Upon receiving the PA headroom feedback and interference-based value at block 702, methodology 700 can proceed to block 704, wherein a determination is made as to whether to honor the interference-based value. In one example, the PA headroom feedback received at block 702 can correspond to a maximum transmit power that the terminal is capable of utilizing while the interference-based value can correspond to a maximum transmit power that can be utilized by the terminal while keeping interference caused by the terminal within a target interference level. Accordingly, the determination made at block 704 can include analyzing quality of service parameters for the terminal and/or other suitable parameters to determine whether it is more beneficial to require the terminal to transmit at a higher power than that provided by the interference-based value despite the interference that doing so may cause within the system.

If it is determined that the interference-based value is to be honored at block 704, methodology 700 proceeds to block 706, wherein a transmit power is assigned for the terminal based on the PA headroom feedback and the interference-based value. Alternatively, if it is determined that the interference-based value is to be discarded at block 704, methodology 700 instead proceeds to block 708, wherein a transmit power is assigned for the terminal based on the PA headroom feedback alone. In both cases, methodology 700 then concludes at block 710, wherein the transmit power assigned at block 706 or block 708 is communicated to the terminal, which can then adjust its transmit power accordingly.

Figure 8:
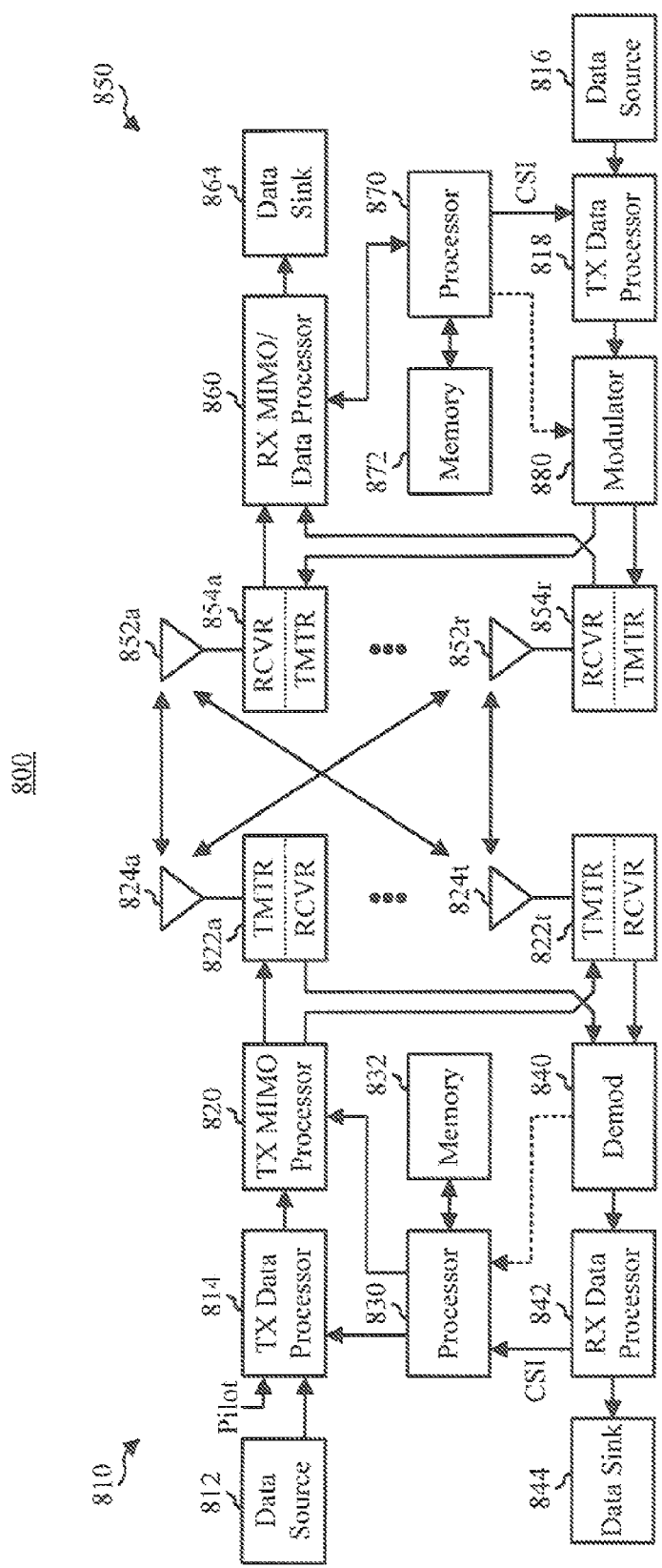
FIG. 8 is a block diagram illustrating an example wireless communication system in which one or more embodiments described herein may function.

Referring now to FIG. 8, a block diagram illustrating an example wireless communication system 800 in which one or more embodiments described herein may function is provided. In one example, system 800 is a multiple-input multiple-output (MIMO) system that includes a transmitter system 810 and a receiver system 850. It should be appreciated, however, that transmitter system 810 and/or receiver system 850 could also be applied to a multi-input single-output system wherein, for example, multiple transmit antennas (e.g., on a base station), may transmit one or more symbol streams to a single antenna device (e.g., a mobile station). Additionally, it should be appreciated that aspects of transmitter system 810 and/or receiver system 850 described herein could be utilized in connection with a single output to single input antenna system.

In accordance with one aspect, traffic data for a number of data streams are provided at transmitter system 810 from a data source 812 to a transmit (TX) data processor 814. In one example, each data stream can then be transmitted via a respective transmit antenna 824. Additionally, TX data processor 814 can format, code, and interleave traffic data for each data stream based on a particular coding scheme selected for each respective data stream in order to provide coded data. In one example, the coded data for each data stream may then be multiplexed with pilot data using OFDM techniques. The pilot data can be, for example, a known data pattern that is processed in a known manner. Further, the pilot data may be used at receiver system 850 to estimate channel response. Back at transmitter system 810, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream may be determined by instructions performed on and/or provided by processor 830.

Next, modulation symbols for all data streams can be provided to a TX processor 820, which may further process the modulation symbols (e.g., for OFDM). TX MIMO processor 820 may then provides $N_T$ modulation symbol streams to $N_T$ transmitters (TMTR) 822*a* through 822*t*. In one example, each transmitter 822 can receive and process a respective symbol stream to provide one or more analog signals. Each transmitter 822 may then further condition (e.g. amplify, filter, and upconvert) the analog signals to provide a modulated signal suitable for transmission over a MIMO channel. Accordingly, $N_T$ modulated signals from transmitters 822*a* through 822*t* can then be transmitted from $N_T$ antennas 824*a* through 824*t*, respectively.

In accordance with another aspect, the transmitted modulated signals can be received at receiver system 850 by $N_R$ antennas 852*a* through 852*r*. The received signal from each antenna 852 can then be provided to a respective receiver (RCVR) 854. In one example, each receiver 854 can condition (e.g., filter, amplify, and downconvert) a respective received signal, digitize the conditioned signal to provide samples, and then processes the samples to provide a corresponding "received" symbol stream. An RX MIMO/data processor 860 can then receive and process the $N_R$ received symbol streams from $N_R$ receivers 854 based on a particular receiver processing technique to provide $N_T$ "detected" symbol streams. In one example, each detected symbol stream can include symbols that are estimates of the modulation symbols transmitted for the corresponding data stream. RX processor 860 can then process each symbol stream at least in part by demodulating, deinterleaving, and decoding each detected symbol stream to recover traffic data for a corresponding data stream. Thus, the processing by RX data processor 818 may be complementary to that performed by TX MIMO processor 820 and TX data processor 814 at transmitter system 810.

In accordance with one aspect, the channel response estimate generated by RX processor 860 may be used to perform space/time processing at the receiver, adjust power levels, change modulation rates or schemes, and/or other appropriate actions. Additionally, RX processor 860 may further estimate channel characteristics such as, for example, signal-to-noise-and-interference ratios (SNRs) of the detected symbol streams. RX processor 860 can then provide estimated channel characteristics to a processor 870. In one example, RX processor 860 and/or processor 870 can further derive an estimate of the "operating" SNR for the system. Processor 870 can then provide channel state information (CSI), which may comprise information regarding the communication link and/or the received data stream. This information may include, for example, the operating SNR. The CSI can then be processed by a TX data processor 878, modulated by a modulator 880, conditioned by transmitters 854*a* through 854*r*, and transmitted back to transmitter system 810.

Back at transmitter system 810, the modulated signals from receiver system 850 can then be received by antennas 824, conditioned by receivers 822, demodulated by a demodulator 840, and processed by a RX data processor 842 to recover the CSI reported by receiver system 850. In one example, the reported CSI can then be provided to processor 830 and used to determine data rates as well as coding and modulation schemes to be used for one or more data streams. The determined coding and modulation schemes can then be provided to transmitters 822 for quantization and/or use in later transmissions to receiver system 850. Additionally and/or alternatively, the reported CSI can be used by processor 830 to generate various controls for TX data processor 814 and TX MIMO processor 820.

In one example, processor 830 at transmitter system 810 and processor 870 at receiver system 850 direct operation at their respective systems. Additionally, memory 832 at transmitter system 810 and memory 872 at receiver system 850 can provide storage for program codes and data used by processors 830 and 870, respectively. Further, at receiver system 850, various processing techniques may be used to process the $N_R$ received signals to detect the $N_T$ transmitted symbol streams. These receiver processing techniques can include spatial and space-time receiver processing techniques, which may also be referred to as equalization techniques, and/or "successive nulling/equalization and interference cancellation" receiver processing techniques, which may also be referred to as "successive interference cancellation" or "successive cancellation" receiver processing techniques.

Figure 9:
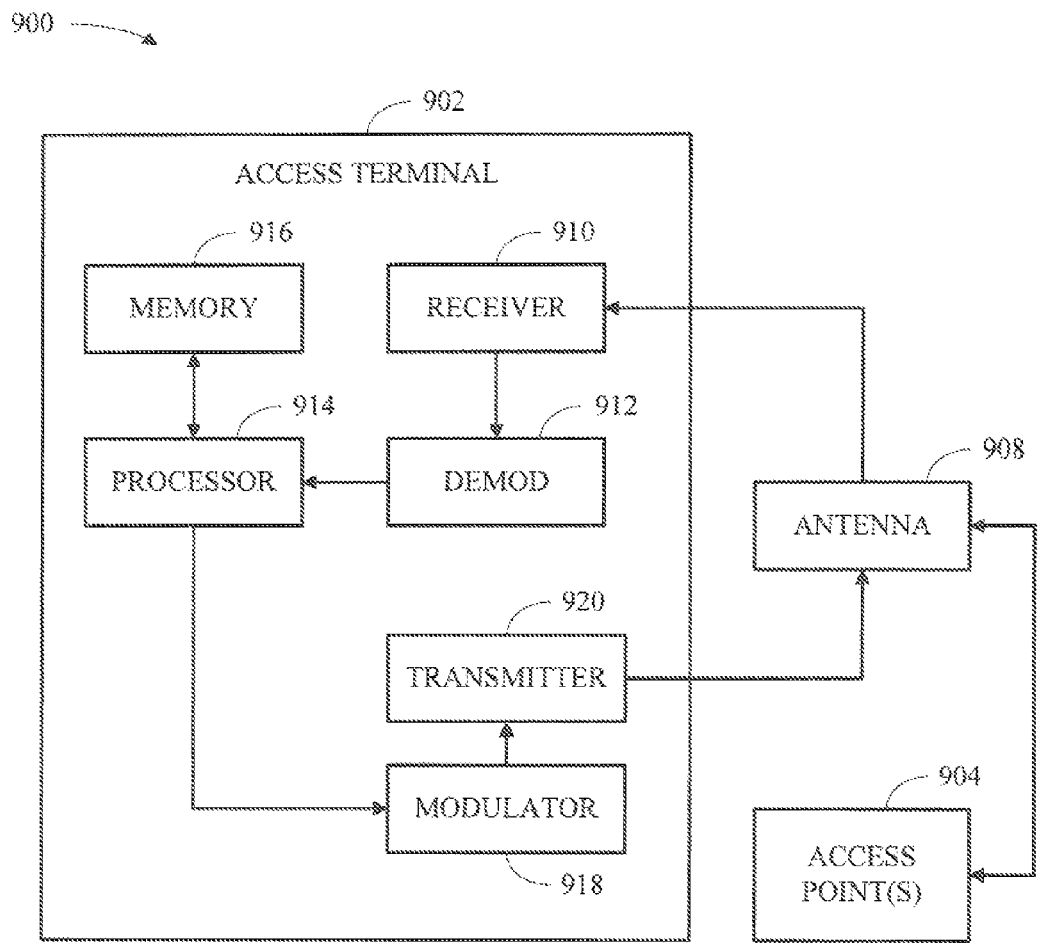
FIG. 9 is a block diagram of a system that provides reverse link feedback for interference control in a wireless communication system in accordance with various aspects.

FIG. 9 is a block diagram of a system 900 that provides reverse link feedback for interference control in a wireless communication system in accordance with various aspects described herein. In one example, system 900 includes an access terminal 902. As illustrated, access terminal 902 can receive signal(s) from one or more access points 904 and transmit to the one or more access points 904 via an antenna 908. Additionally, access terminal 902 can comprise a receiver 910 that receives information from antenna 908. In one example, receiver 910 can be operatively associated with a demodulator (Demod) 912 that demodulates received information. Demodulated symbols can then be analyzed by a processor 914. Processor 914 can be coupled to memory 916, which can store data and/or program codes related to access terminal 902. Additionally, access terminal 902 can employ processor 914 to perform methodologies 400, 600, and/or other appropriate methodologies. Access terminal 902 can also include a modulator 918 that can multiplex a signal for transmission by a transmitter 920 via antenna 908 to one or more access points 904.

Figure 10:
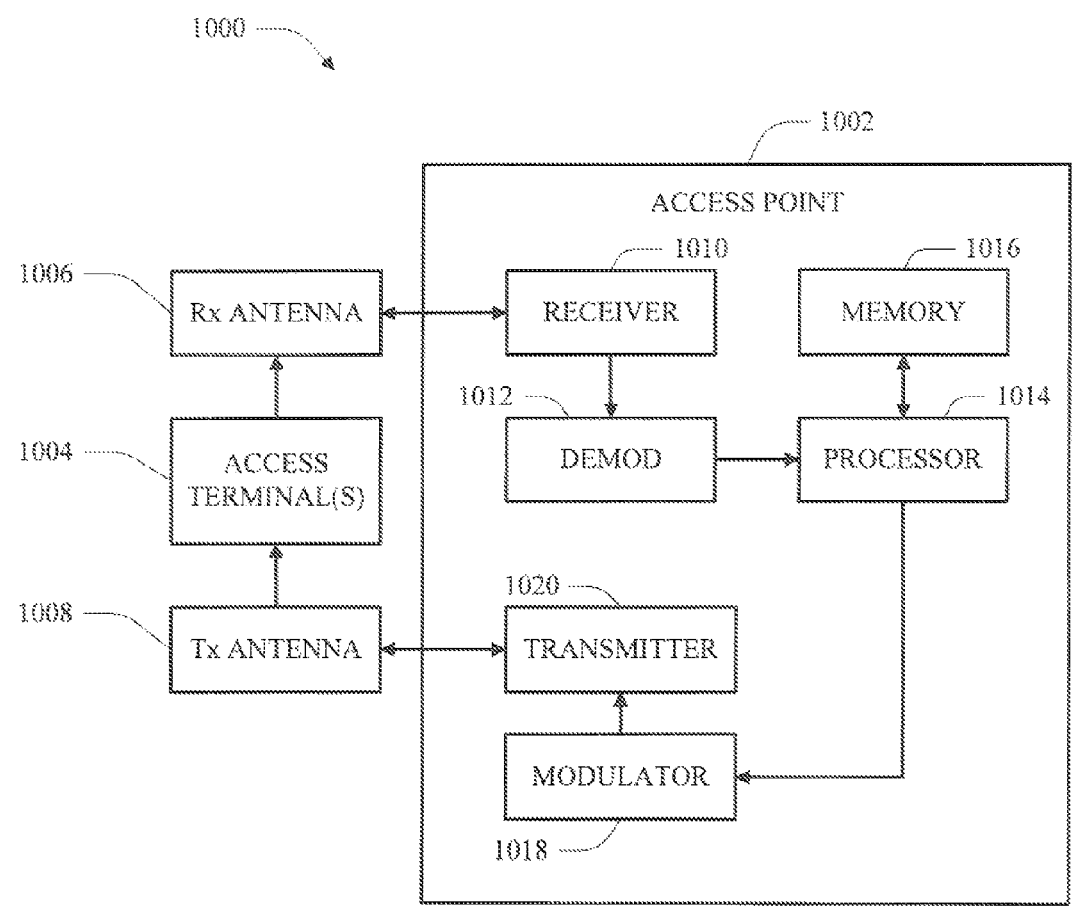
FIG. 10 is a block diagram of a system that coordinates reverse link power control and interference management in a wireless communication system in accordance with various aspects.

FIG. 10 is a block diagram of a system 1000 that coordinates reverse link power control and interference management in a wireless communication system in accordance with various aspects described herein. In one example, system 1000 includes a base station or access point 1002. As illustrated, access point 1002 can receive signal(s) from one or more access terminals 1004 via a receive (Rx) antenna 1006 and transmit to the one or more access terminals 1004 via a transmit (Tx) antenna 1008.

Additionally, access point 1002 can comprise a receiver 1010 that receives information from receive antenna 1006. In one example, the receiver 1010 can be operatively associated with a demodulator (Demod) 1012 that demodulates received information. Demodulated symbols can then be analyzed by a processor 1014. Processor 1014 can be coupled to memory 1016, which can store information related to code clusters, access terminal assignments, lookup tables related thereto, unique scrambling sequences, and/or other suitable types of information. In one example, access point 1002 can employ processor 1014 to perform methodologies 500, 700, and/or other appropriate methodologies. Access point 1002 can also include a modulator 1018 that can multiplex a signal for transmission by a transmitter 1020 through transmit antenna 1008 to one or more access terminals 1004.

Figure 11:
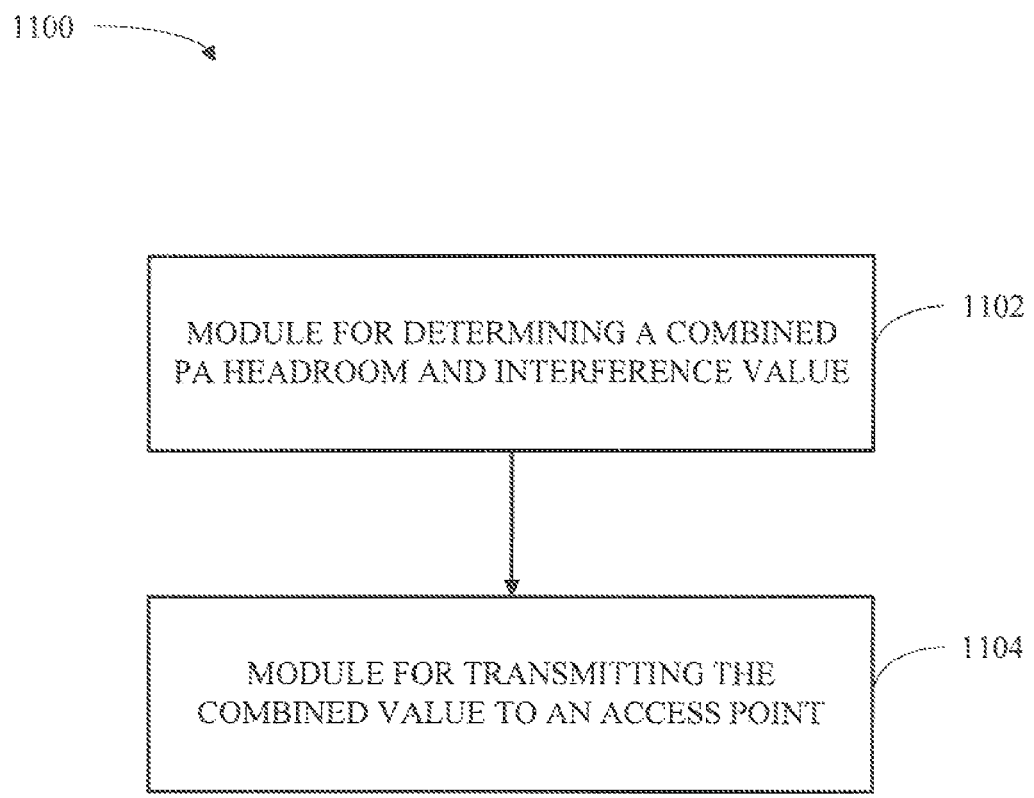
FIG. 11 is a block diagram of an apparatus that facilitates reverse link feedback for interference management in a wireless communication system.

FIG. 11 illustrates an apparatus 1100 that facilitates reverse link feedback for interference management in a wireless communication system (e.g., system 300). It is to be appreciated that apparatus 1100 is represented as including functional blocks, which can be functional blocks that represent functions implemented by a processor, software, or combination thereof (e.g. firmware). Apparatus 1100 can be implemented in a terminal (e.g., terminal 310) and/or another suitable network entity and can include a module for determining a combined PA headroom and interference value 1102. Further, apparatus 1100 can include a module for transmitting the combined value to an access point 1104.

Figure 12:
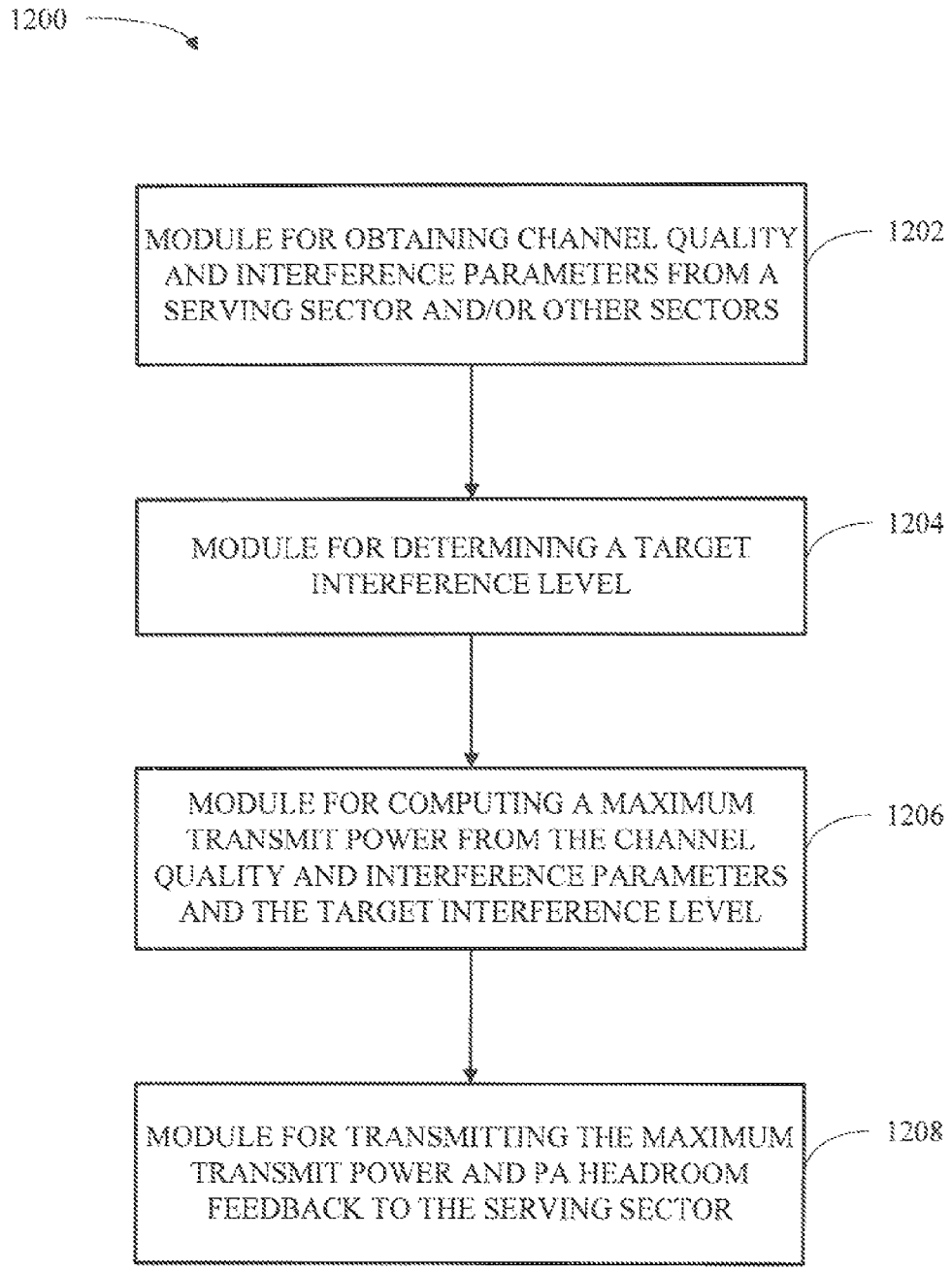
FIG. 12 is a block diagram of an apparatus that facilitates the generation and transmission of reverse link feedback for power control and interference management in a wireless communication system.

FIG. 12 illustrates an apparatus 1200 that facilitates the generation and transmission of reverse link feedback for power control and interference management in a wireless communication system. It is to be appreciated that apparatus 1200 is represented as including functional blocks, which can be functional blocks that represent functions implemented by a processor, software, or combination thereof (e.g., firmware). Apparatus 1200 can be implemented in a terminal and/or another suitable network entity and can include a module for obtaining channel quality and interference parameters from a serving sector and/or other sectors 1202. Further, apparatus 1200 can include a module for determining a target interference level 1204, a module for computing a maximum transmit power from the channel quality and interference parameters and the target interference level 1206, and a module for transmitting the maximum transmit power and PA headroom feedback to the serving sector 1206.

Figure 13:
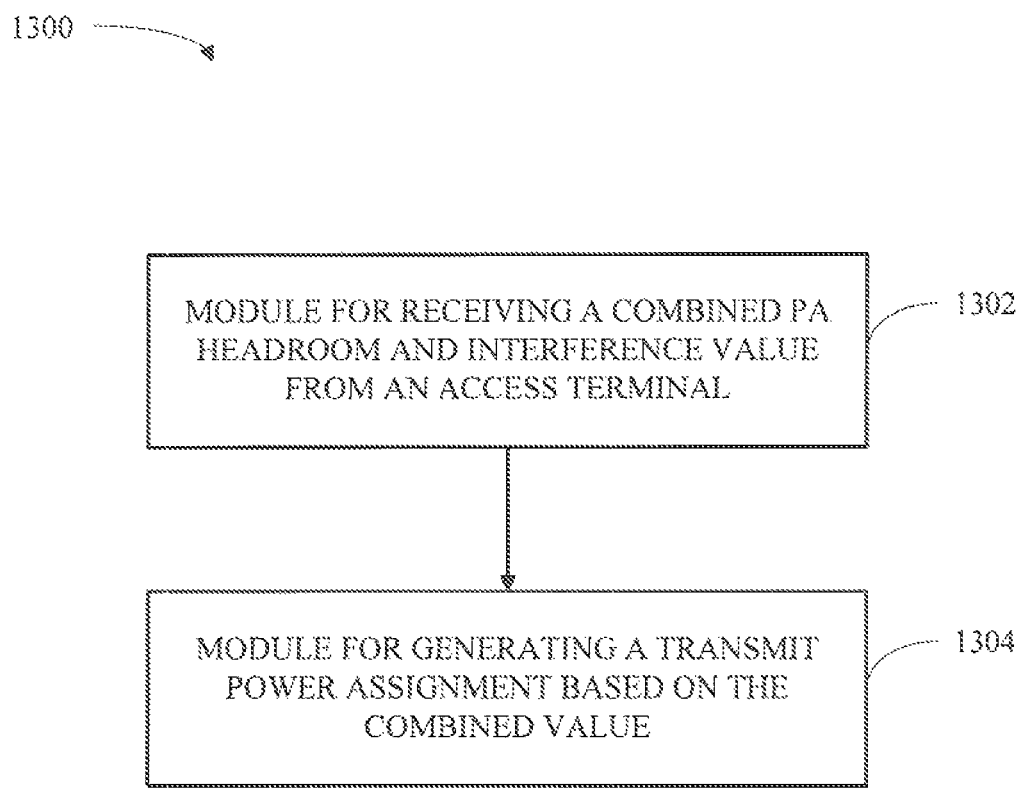
FIG. 13 is a block diagram of an apparatus that facilitates reverse link power control in a wireless communication system.

FIG. 13 illustrates an apparatus 1300 that facilitates reverse link power control in a wireless communication system. It is to be appreciated that apparatus 1300 is represented as including functional blocks, which can be functional blocks that represent functions implemented by a processor, software, or combination thereof (e.g., firmware). Apparatus 1300 can be implemented in an access point (e.g., serving sector 320) and/or another suitable network entity in a wireless communication system and can include a module for receiving a combined PA headroom and interference value from an access terminal 1302. Further, apparatus 1300 can include a module for generating a transmit power assignment based on the combined value 1304.

Figure 14:
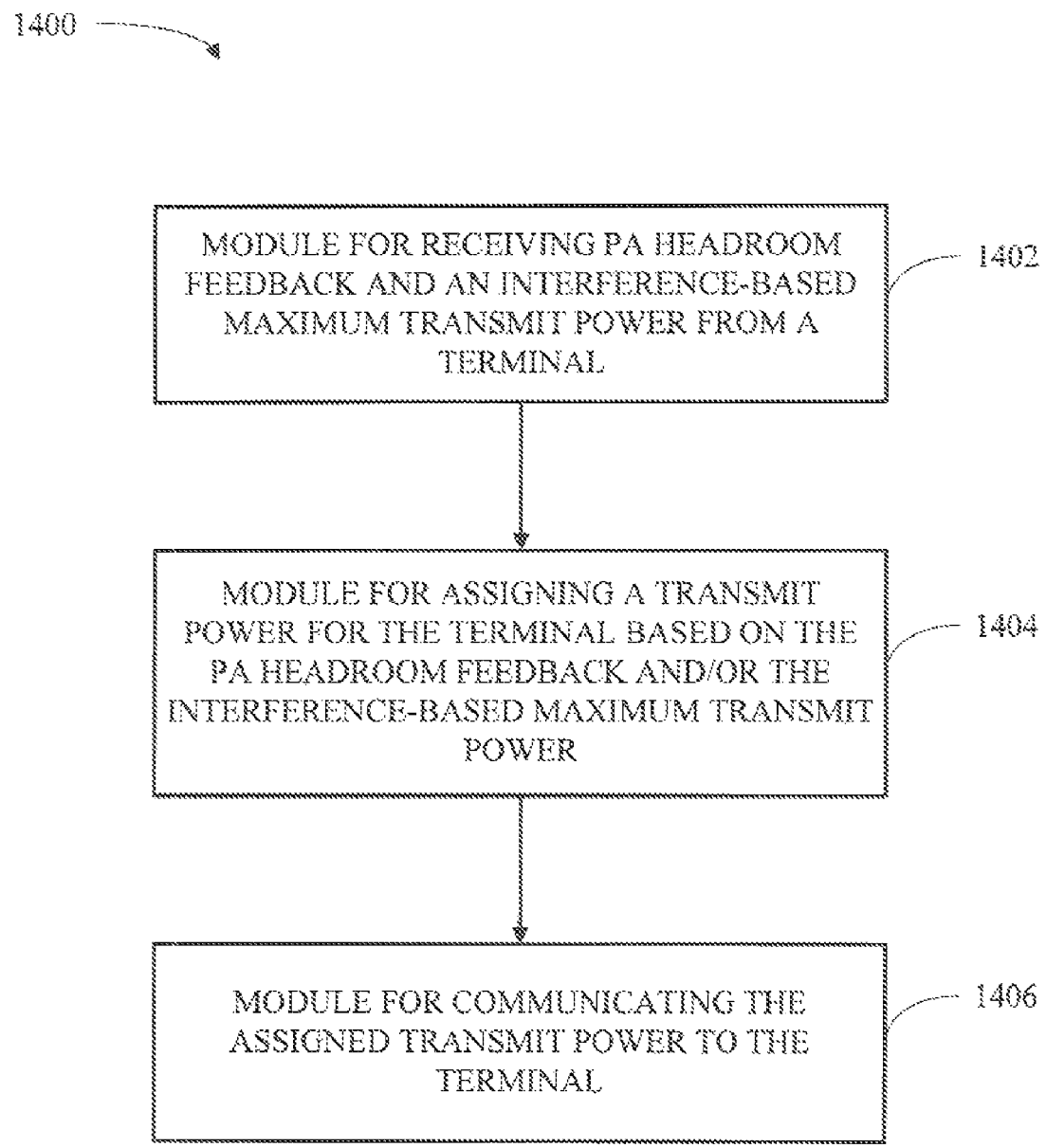
FIG. 14 is a block diagram of an apparatus that facilitates the provision of a transmit power assignment to a terminal for reverse link power control and interference management in a wireless communication system.

FIG. 14 illustrates an apparatus 1400 that facilitates the provision of a transmit power assignment to a terminal for reverse link power control and interference management in a wireless communication system. It is to be appreciated that apparatus 1400 is represented as including functional blocks, which can be functional blocks that represent functions implemented by a processor, software, or combination thereof (e.g., firmware). Apparatus 1400 can be implemented in an access point and/or another suitable network entity in a wireless communication system and can include a module for receiving PA headroom feedback and an interference-based maximum transmit power from a terminal 1402. Further, apparatus 1400 can include a module for assigning a transmit power for the terminal based on the PA headroom feedback and/or the interference-based maximum transmit power 1404 and a module for communicating the assigned transmit power to the terminal 1406.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A wireless communications apparatus, comprising:
a memory that stores data relating to a difference in channel quality between a serving sector and a dominant interference sector and data relating to a target interference level; and
a processor configured to compute a combined power amplifier (PA) headroom and interference value based at least in part on the difference in channel quality and the target interference level and to instruct transmission of the combined value to the serving sector;
wherein the combined PA headroom and interference value comprises a value based on a combination of a PA headroom portion of the value and an interference portion of the value.

2. The wireless communications apparatus of claim 1, wherein the processor is further configured to instruct transmission of the combined value in a medium access control (MAC) header of a packet.

3. The wireless communications apparatus of claim 1, wherein the processor is further configured to instruct transmission of the combined value in a dedicated channel.

4. The wireless communications apparatus of claim 1, wherein the processor is further configured to instruct transmission of the combined value as part of channel state information feedback.

5. The wireless communications apparatus of claim 1, wherein the processor is further configured to determine a maximum supportable transmit power spectral density (PSD) based at least in part on the target interference level.

6. The wireless communications apparatus of claim 1, wherein the processor is further configured to determine a maximum supportable bandwidth based on the target interference level and a reference transmit power spectral density (PSD).

7. The wireless communications apparatus of claim 1, wherein the processor is further configured to compute an interference-independent PA headroom value and to instruct transmission of the PA headroom value to the serving sector.

8. The apparatus of claim 1, wherein the target interference level comprises an interference operating point corresponding to an acceptable level of interference caused in the dominant interference sector.

9. The apparatus of claim 1, wherein the combined PA headroom and interference value is indicative of a maximum transmission power level that keeps an interference level below the target interference level.

10. The apparatus of claim 1, wherein the PA headroom portion comprises a measure of a maximum transmit power.

11. The apparatus of claim 1, wherein the interference portion comprises a measure of interference between the wireless communications apparatus and another wireless communications apparatus.

12. A method comprising:
storing data relating to a difference in channel quality between a serving sector and a dominant interference sector and data relating to a target interference level;
generating a combined power amplifier (PA) headroom and interference value based at least in part on the difference in channel quality and the target interference level;
wherein the combined PA headroom and interference value comprises a value based on a combination of a PA headroom portion of the value and an interference portion of the value: and
instructing transmission of the combined value to the serving sector.

13. The method of claim 12, further comprising instructing transmission of the combined value in a medium access control (MAC) header of a packet.

14. The method of claim 12, further comprising instructing transmission of the combined value in a dedicated channel.

15. The method of claim 12, further comprising instructing transmission of the combined value as part of channel state information feedback.

16. The method of claim 12, further comprising determining a maximum supportable transmit power spectral density (PSD) based at least in part on the target interference level.

17. The method of claim 12, further comprising determining a maximum supportable bandwidth based on the target interference level and a reference transmit power spectral density (PSD).

18. The method of claim 12, further comprising computing an interference-independent PA headroom value and instructing transmission of the PA headroom value to the serving sector.

19. The method of claim 12, wherein the combined PA headroom and interference value is indicative of a maximum transmission power level that keeps an interference level below the target interference level.

20. The method of claim 12, wherein the PA headroom portion comprises a measure of a maximum transmit power.

21. The method of claim 12 wherein the interference portion comprises a measure of interference between a first wireless communications apparatus and a second wireless communications apparatus.

22. A wireless communications apparatus, comprising:
a means for storing data relating to a difference in channel quality between a serving sector and a dominant interference sector and data relating to a target interference level; and
a means for computing a combined power amplifier (PA) headroom and interference value based at least in part on the difference in channel quality and the target interference level and for instructing transmission of the combined value to the serving sector;

wherein the combined PA headroom and interference value comprises a value based on a combination of a PA headroom portion of the value and an interference portion of the value.

23. The apparatus of claim 22, further comprising means for instructing transmission of the combined value in a medium access control (MAC) header of a packet.

24. The apparatus of claim 22, further comprising means for instructing transmission of the combined value in a dedicated channel.

25. The apparatus of claim 22, further comprising means for instructing transmission of the combined value as part of channel state information feedback.

26. The apparatus of claim 22, further comprising means for determining a maximum supportable transmit power spectral density (PSD) based at least in part on the target interference level.

27. The apparatus of claim 22, further comprising means for determining a maximum supportable bandwidth based on the target interference level and a reference transmit power spectral density (PSD).

28. The apparatus of claim 22, further comprising means for computing an interference-independent PA headroom value and instructing transmission of the PA headroom value to the serving sector.

29. The apparatus of claim 22, wherein the combined PA headroom and interference value is indicative of a maximum transmission power level that keeps an interference level below the target interference level.

30. The apparatus of claim 22, wherein the PA headroom portion comprises a measure of a maximum transmit power.

31. The apparatus of claim 22, wherein the interference portion comprises a measure of interference between the wireless communications apparatus and another wireless communications apparatus.

32. A computer-readable storage medium encoded with instructions for causing one or more programmable processors of a computing device to:

store data relating to a difference in channel quality between a serving sector and a dominant interference sector and data relating to a target interference level; and compute a combined power amplifier (PA) headroom and interference value based at least in part on the difference in channel quality and the target interference level and to instruct transmission of the combined value to the serving sector;

wherein the combined PA headroom and interference value comprises a value based on a combination of a PA headroom portion of the value and an interference portion of the value.

33. The computer-readable storage medium of claim 32, wherein the combined PA headroom and interference value is indicative of a maximum transmission power level that keeps an interference level below the target interference level.

34. The computer-readable storage medium of claim 32, wherein the PA headroom portion comprises a measure of a maximum transmit power.

35. The computer-readable storage medium of claim 32 wherein the interference portion comprises a measure of interference between a first wireless communications apparatus and a second wireless communications apparatus.

* * * * *